United States Patent [19]

Hill

[11] Patent Number: 4,599,820
[45] Date of Patent: Jul. 15, 1986

[54] METHOD AND APPARATUS FOR SELECTING FISHING LURE COLOR

[76] Inventor: Loren G. Hill, 2826 Castlewood, Norman, Okla. 73069

[21] Appl. No.: 665,543

[22] Filed: Oct. 26, 1984

[51] Int. Cl.<sup>4</sup> ............................................. A01K 97/00
[52] U.S. Cl. ............................................. 43/4.5; 43/4
[58] Field of Search ............... 43/4, 4.5; 356/419, 356/442

[56] References Cited

U.S. PATENT DOCUMENTS

| | | | |
|---|---|---|---|
| 2,532,061 | 11/1950 | Glick | 43/4 |
| 2,809,458 | 10/1957 | Wilbourn | 356/421 |
| 3,365,818 | 1/1968 | Greiner | 43/4 |
| 3,876,312 | 4/1975 | Harcrow | 43/4 |
| 3,897,157 | 7/1975 | McLaughlin | 43/4 |
| 4,445,178 | 4/1984 | Scheer | 43/4 |

FOREIGN PATENT DOCUMENTS 1131119  10/1968  United Kingdom ............ 43/4

*Primary Examiner*—Nicholas P. Godici
*Assistant Examiner*—Kurt Rowan
*Attorney, Agent, or Firm*—William R. Laney

[57] ABSTRACT

A method for selecting a fishing lure of a color or colors most visible and attractive to fish which includes the steps of observing the condition of the water to be fished to determine the relative clarity of the water, then measuring the light transmittance at the depth in the water to be fished. The water condition observed and the light transmittance value measured are then compared with a color chart upon which colors have been precorrelated to light transmittance values and water clarity conditions according to which color is most attractive to fish at a specific transmittance value and water condition. A lure color is selected on the basis of such comparison, and used to fish at the depth at which the water transmittance value has been measured.

The method is carried out by using an apparatus which includes a device for lowering a light sensing probe into the water, and further including a color chart and associated light meter which shows which color is preferred by (most attractive to) fish under the most frequently encountered water conditions, and when the light transmittance at selected fishing depths in that type of water is at any specific one of a number of light transmittance values.

18 Claims, 36 Drawing Figures

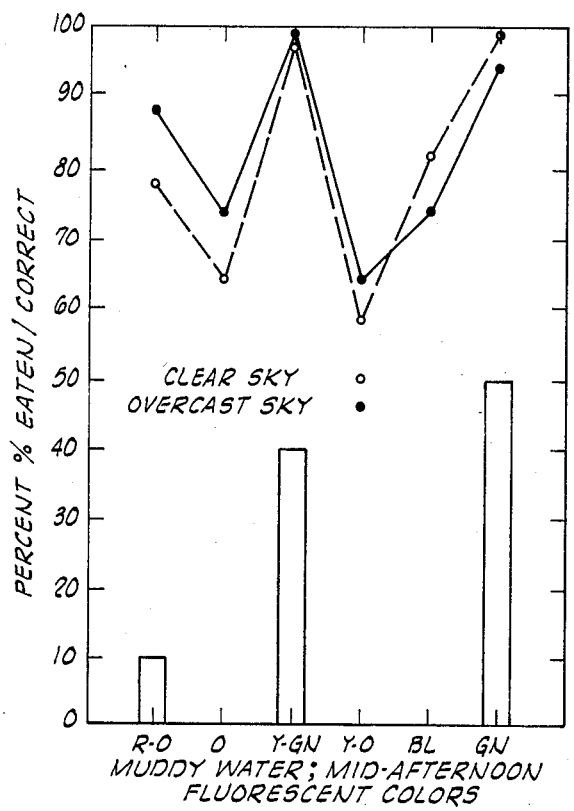
FIG. 33
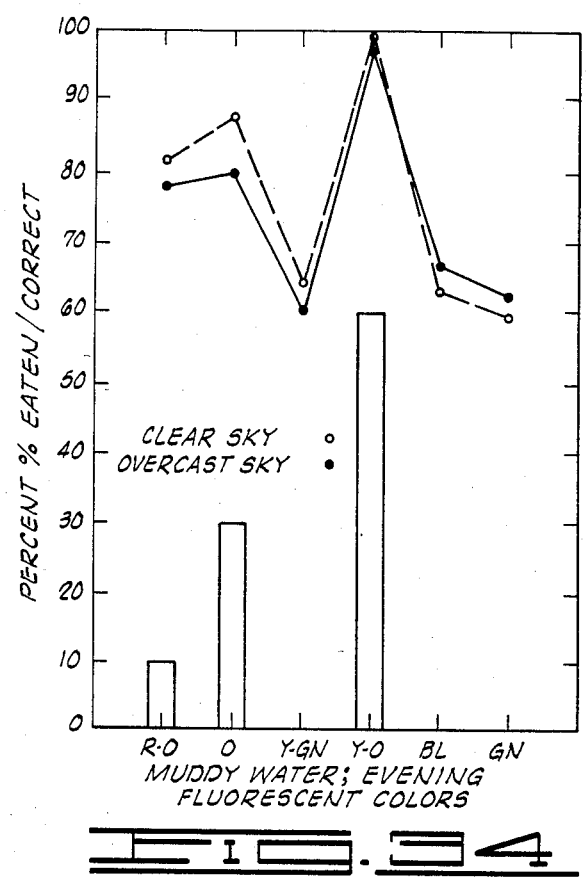
FIG. 34
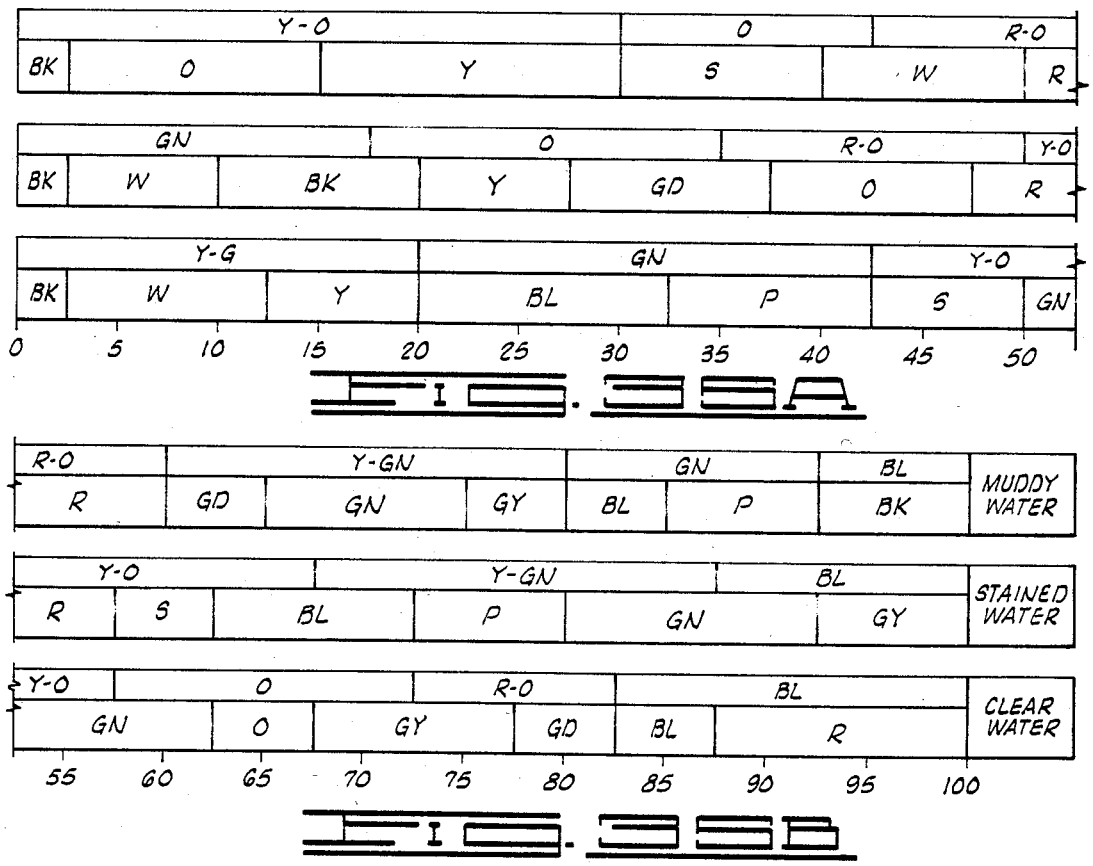
FIG. 35A
FIG. 35B

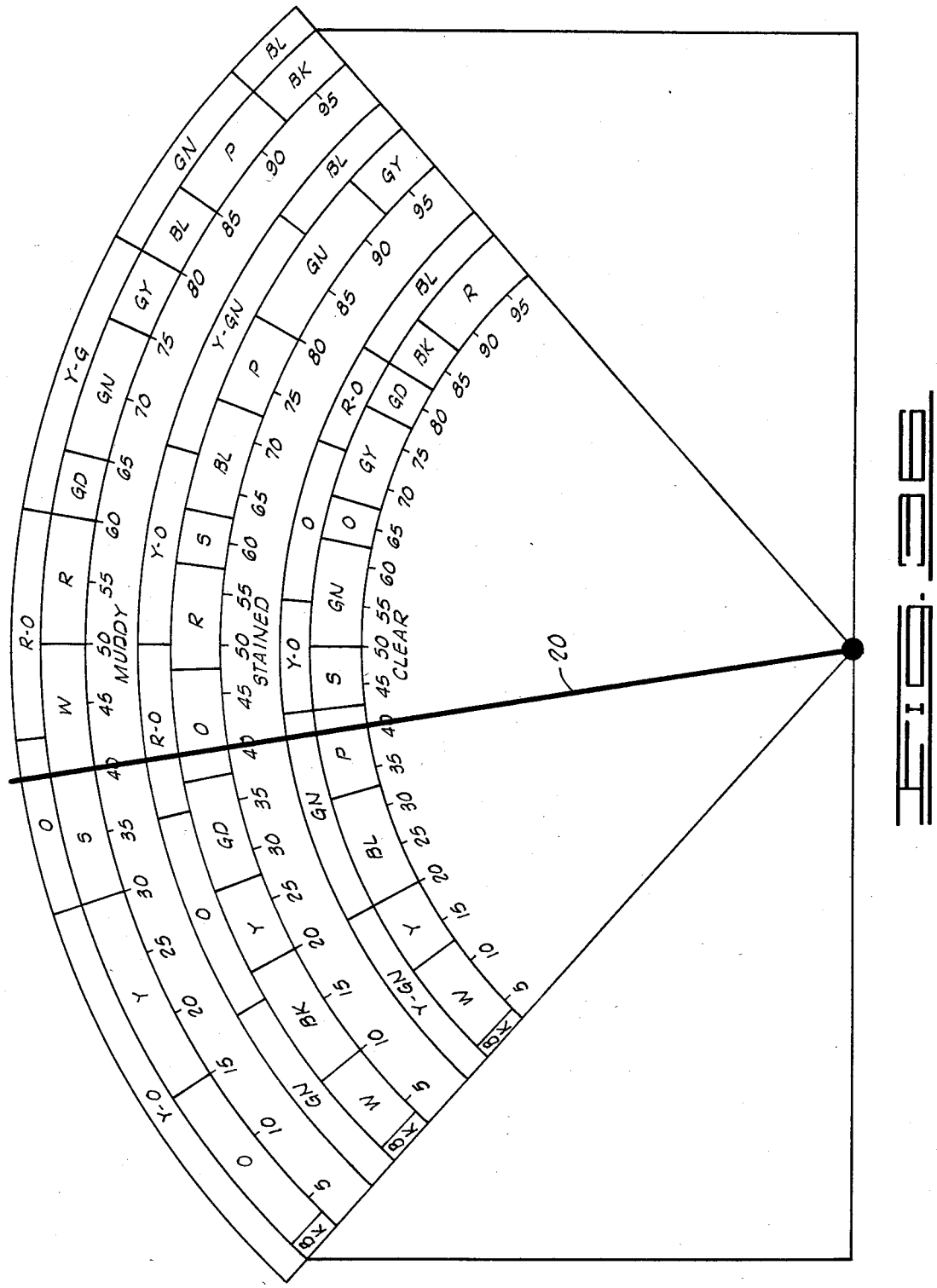

METHOD AND APPARATUS FOR SELECTING FISHING LURE COLOR

FIELD OF THE INVENTION

This invention relates to methods and apparatus for catching fresh water sport fish, and more particularly, but not by way of limitation, to a method, and an apparatus for practicing the method, by which a fishing lure having a color which will relatively effectively attract bass fish may be selected and used.

BACKGROUND AND DEVELOPMENT OF THE INVENTION

Thousands, perhaps millions, of dollars are spent annually for the purchase of highly colored fishing lures by sportsmen, and it is a widely held belief that bass, under some environmental circumstances, prefer one color or combinations of colors to the colors preferred by the bass under different circumstances.

The color vision of fish has been scientifically investigated, as have the ways in which variations in water depth and turbidity affect the properties of light transmitted therethrough. There appears to be little agreement, however, as to how the color perception of fish compares to that of humans, or how the location of mature game fish in various kinds of water, and under various ambient light conditions, affects the way a particular species of fish envisions a colored object located in relatively close proximity to such fish.

In U.S. Pat. No. 3,897,157 issued to McLaughlin et al, a colorimeter discribed as useful in selecting a particular color of fishing lure for use in fishing is described. In the McLaughlin device, a probe which can be lowered into the water is provided and is constructed to provide a plurality of prism-shaped photocells disposed inside a plurality of serially and vertically stacked circular light filter discs. This instrument is connected to a readout device at the surface.

The photocells utilized are selected to have a particular resistance which varies with the intensity of light impinging on the photocells. The filters are selected so that each filters white light so as to direct light of a particular wave length onto one of the respective photocells. By means of this device, including the matched color filters and associated photocells, the device provides at the readout instrument located at the surface, a visual indication of the relative intensities of different colors of light below the surface of the body of water. Thus, if the color blue is shown by the instrument to be more intense than the color red, the theory of operation and use of the device is that blue is the color which would be better seen by fish at the location where the probe is located in the water, and that a blue lure should be used by the fisherman. In other words, the instrument measures the intensity of light of different wavelengths at a particular depth in the water, and that wavelength which is most intense at that depth, as determined by the particular photocell sensitive to that color is the color which, in theory, the fish should see best.

This device is, of course, based on the supposition that the fish sees light as does a human, and that the color of lure which will be best seen by the fish is the color of lure which corresponds in its color to a particular part of the visible spectrum which is more intense at the particular depth in question. Thus, the assumption is, that having broken apart white light at the depth at which the probe is located, that part of the spectrum corresponding to a particular color of a specific wavelength which is of the greatest intensity will be the color best seen by the fish. As hereinafter shown, other workers have not agreed that light intensity is of equal or greater importance than wavelength difference. In other words, other theories would say that even though blue, for example, may be the most intense monohcromatic color at a given depth and under given environmental conditions, a bass fish will still be more attracted to a red lure than to a blue lure.

The studies of Schiemenz in 1924 and Wolff in 1926 demonstrated that fish tested were able to distinguish among about twenty colors of the visible spectrum, and also ultraviolet, by reason of the wavelength of the color, as opposed to the brightness of a particular color.

In 1937, F. A. Brown concluded that bass see colors in about the same way that humans would perceive the same colors when viewing them through a yellowish filter. He further concluded that both wavelength and intensity play a part in the ability of the bass to see certain colors. His research indicated that red was the most readily perceptible color to the bass, followed by yellow, with blue and black being much less perceptible. The Brown research, however, was carried out with very young bass not exceeding about one to two inches in length, and was carried out under laboratory conditions in water of unreported clarity, and under an illumination of from 12 to 20-foot candles. No attempt was made to simulate varying ambient light due to changing atmospheric conditions, or to vary the clarity of the water used in the experiments. *Illinois Natural History Survey Bulletin*, Vol. 21, Art. 2, May, 1937.

In studies carried out by the Bureau of Medicine and Surgery of the Navy Department, and reported in the *Journal of the Optical Society of America*, Vol. 57, No. 6, p. 802, 1967, the underwater visibility to scuba divers of various colors, both fluorescent and non-fluorescent, was measured in four different bodies of water which were selected to sample the continuum from very murky to clear. The studies determined that fluorescent colors were always more visible than non-fluorescent, and that various colors were better seen under different water conditions. Blue-green color of a wavelength of 480 nm was best seen in pure water of good clarity. As the water becomes less clear, the peak of the light transmittance curve for various colors moved from 480 nm toward the longer wavelengths. One of the interesting observations resulting from these experiments was that, while there were certainly variations of the spectral distribution of natural daylight in water due to atmospheric conditions, such as a rainy day versus a sunny day, these were minor in their effect upon color visibility to the divers compared to the turbidity or clarity of the water. In very murky, highly stained or muddy water, the colors best seen by the scuba divers when viewed horizontally at a depth of about five feet in the water were white, yellow and orange in non-fluorescent colors and yellow-orange, orange and red-orange in fluorescent colors. The most difficult colors to see in this type of water were black, gray, blue and green. In very clear water, blue and yellow non-fluorescent colors were relatively easily seen and fluorescent green and white were highly visible.

In waters of medium clarity (some slight murkiness) white, yellow and orange (all non-fluorescent) were readily seen, as were the fluorescent orange and fluorescent green colors. The lowest visibility was found to characterize gray, blue, green and black. It should be pointed out that these tests determined which of the various colored objects viewed by the divers were seen most accurately in terms of their ability to correctly identify the color of the object. The results, however, indicated that some colors were seen by the divers in certain of the waters in which the tests were conducted as different colors (from their appearance above water), and in such case, no consideration was given to the fact that the object, although seen as a certain incorrect color, was nevertheless seen clearly and perhaps better than in the instance where the object was seen as the correct color, i.e., the color which is used to describe the object if viewed in ambient light above the surface of the water. A conclusion drawn from the tests was that, in general, the wavelength of the actual color of the object tended to shift toward a longer wavelength as the murkiness or muddiness of the water increases and clarity decreases. Thus, blue tended to be seen as green, and yellow tended to be seen as orange and orange tended to be seen as red. In clear water the opposite tendency was observed.

A device for measuring and indicating the light intensity level at various depths in the water for the purpose of indicating light intensities at such depths to the fisherman is described in Harcrow, Jr. U.S. Pat. No. 3,876,312. A control means located at the surface which receives a signal from the water turbidity measuring device located at a certain depth displays on a readout instrument, the percentage of light present at the light sensing device relative to the surface light (or other standard). The Harcrow light intensity measuring and indicating device does not, however, provide any indication of the color which fish perceive best, or, more importantly, are most attracted to, under the measured light intensity, and in waters of varying clarity.

In 1976, Professor Don McCoy at the University of Kentucky carried out a number of experiments having as their objective determining how largemouth bass learn and perceive color. As a result of these experiments, all of which were conducted in an aquarium with clear water and simulated natural light, McCoy concluded that bass can clearly discriminate between a variety of colors; that a preference, under the testing conditions used, is demonstrated for the color green, and that wavelength is much more important in the ability of the bass to perceive and strike at colored targets than is the brightness of the target. Variation in target brightnesses, no matter what the color used, did not give rise to any significant difference in the basses' inclinations to strike the target. McCoy recognized that the deduced facts as to the inclination of the bass to strike targets of various color may be altered as a function of other variables which were not examined in the McCoy experiments, such as water clarity, and varying ambient light conditions. The McCoy experiments, in addition to suggesting that the bass demonstrated a preference for the color green relative to other colors under the conditions of the tests, further suggested that the bass demonstrates a slight aversion to the color yellow.

According to the Eastman Kodak Company in the publication, "The Fifth And Sixth Here's How", Combined Edition, 1977, pages 38-39, as light penetrates deeper below the surface of the water, the colors of the spectrum are selectively absorbed. The blue-green color of the water is said to act as a filter, absorbing colors at the red end of the spectrum. This statement, however, presupposes that the water is blue-green in color, and appears to be referring to the oceans, seas, and certain large bodies of fresh water, as opposed to some other smaller lakes where the color of the water may be brownish, reddish or even approach black in rare instances. In any event, in water of a blue-green color, progressively less red and orange light reaches underwater subjects, and thus these colors become progressively less perceptible at greater depths. Red, in fact, becomes reduced in its intensity at about ten feet in such water and at about twenty-five feet, red begins to appear brownish black. Orange becomes greenish in color at about thirty feet and yellow also becomes greenish in color at a depth slightly greater than thirty feet in blue-green water. In this type of water, the greens do not change color or fade until depths of 100 feet or more are reached.

The Kodak article states that one interesting exception to the manner in which long wavelength colors fade away to different colors as depth increases occurs in the case of the fluorescent dyes, which retain their normal hues, regardless of depth.

In this book, "The Silent World", Jacques Cousteau suggests that the angle of the sun over the surface of the water (i.e., the time of day) is much more important to the amount of light which penetrates the water to a significant depth than is the sky condition. He explains that this is so because at mid-morning, noon and mid-afternoon, the sun's rays strike the surface of the water more directly, rather than at a glancing angle, and thus more of the light enters the water as a result of less reflectance at these times as compared to early morning or dusk. Cousteau also recognized that the sea, by reason of its color, is a bluing agent, turning the appearance of articles at substantial depths blue. Cousteau confirmed that at fifteen feet, red turns to pink, and at forty feet becomes virtually black. At about this depth, orange also disappeared and at substantially greater depths, yellow began turning to green. Cousteau describes an underwater spear fishing expedition in which a fish species was harpooned at a depth of 120 feet, and blood which issued from it at that depth was green in color. As the spear fishermen moved toward the surface, the blood turned dark brown at fifty-five feet and at twenty feet turned pink. On the surface, it flowed red.

Within the experience of Homer Circle, well-known angling editor, as reported in *Sports Afield*, March, 1973, page 46 et seq., red, one of the traditionally best bass-catching colors, remains red until just before it turns black as the depth at which it is viewed increases. Yellow turns white shortly before the red turns to black, but remains visible as white much longer than the red continues to be visible. According to Circle, at some depth, the red disappears and cannot be seen. Chartreuse remained visible to a greater depth than yellow. Circle confirmed the great depths to which fluorescent colors remain visible as the same color as seen at the surface. Blue and purple remain visible to the greatest depths, although both blue and purple take on variable shades of dark violet at greater depths. The particular ambient light conditions prevailing over the water during the Circle observations were not reported. The water was reported as of good clarity.

GENERAL DESCRIPTION OF THE PRESENT INVENTION

Through a number of experiments, I have confirmed that bass fish have a relatively well developed color vision, and respond in a predictable and repeatable way to proximate colored objects under known recurrent conditions of water clarity and light intensity or transmittance. By numerous observations, I have identified the lure color most visible and attractive to bass fish under the great majority of atmospheric and water conditions under which a fisherman is likely to fish, thereby enabling knowledgeable selectivity to be exercised by the fisherman in choosing the color of lure which will be most effective in attracting and catching fish. Surprisingly, I have found that ambient light conditions which prevail at various times of the day and night are sufficiently consistent and repeatable for that particular time of the day or night, in terms of the response of bass fish thereto, that, when the water condition (in terms of its clarity) is held substantially constant, the color preception and response traits of the bass are repeatable and predictable. I have also surprisingly found that as the light transmissivity in the water to be fished is altered due to variations in the clarity of the water as a result of staining or undissolved solids, such as mud, the color perception and response traits of the bass are also altered in a predictable manner.

Since the morphological and anatomical structures and characteristics of the eye and vision nervous system of most predatory game fish are substantially the same, I believe my findings and conclusions should hold true for such fish in general.

On the basis of these observations and discoveries, I have developed a color chart which portrays the conditions of light transmissivity and water clarity which will indicate the use of a lure of a particular color. By using this charted correlation of each fish-preferred color with a specific water condition and light transmissivity value, the fisherman needs only to observe the water clarity condition, and measure the light transmissivity at the depth at which he desires to fish, in order to then select from the chart, the lure color which will be most effective in attracting and catching fish at that depth.

In sum, the method which I have invented for attracting and catching fish includes the steps of observing the condition of the water to be fished to determine whether the water is clear, stained or muddy. In addition to this visual observation, the light transmittance is measured at the depth in the water where the fisherman desires to fish. The transmittance value thus obtained, and the water condition observed, are then located on a chart which correlates these parameters to a particular lure color. These correlations portrayed on the chart are based upon my determinations of each particular color which functions most effectively (in attracting fish) for the specific parameter values thus identified. Having selected the lure of the proper color, it is then lowered to the depth at which the water transmittance value was obtained, and usual fishing operations are thereafter carried out.

For the purpose of practicing the method of the invention, I have developed one effective form of apparatus which includes a color chart correlating lure colors to the parameters described, which chart is integrated with a current deflected needle in a light transmittance value readout device. In one embodiment, the chart-readout meter device is mounted on a fishing boat. The boat also carries a light-sensing probe which can be lowered into the water to various selected depths, and which there functions to measure the light transmittance value at that depth. A Secchi disc is also carried on the boat and used to measure water clarity. In a preferred embodiment of the invention, the probe and Secchi disc are integrated into a single structure.

In other embodiments, the chart-readout meter device can be hand carried rather than mounted on the boat.

An object of the present invention is to provide a method by which a fisherman can select fishing lures having a color which is more attractive to fish than other colors.

A further object of the invention is to provide an apparatus which can be used by fisherman to make certain measurements and observations, and on the basis of these, to make a rational selection of a lure of one or more colors which will increase the success of the fisherman.

A further object of the invention is to provide an apparatus which is sufficiently simple and easily used that a fisherman can quickly, easily and correctly use the apparatus to obtain an indication of the best color of lure to be used in fishing.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

Figure 1:
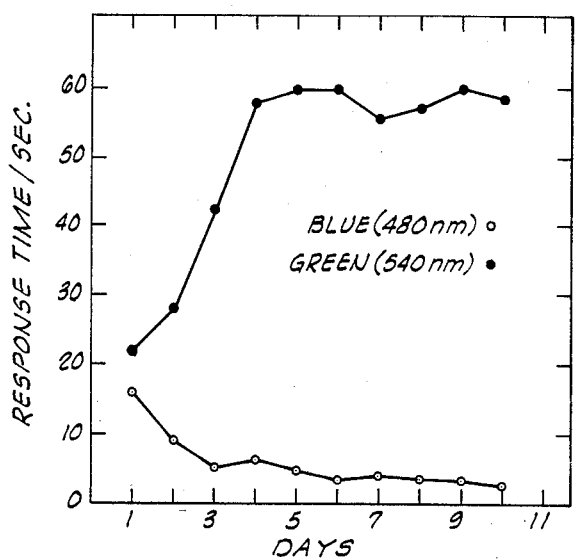
FIG. 1 is a graph in which the response time required for a bass to strike a colored target is plotted against time, in days, over which colored targets colored blue and green were exposed to a bass which had previously been trained to strike a target colored green.

FIGS. 4–34 are graphs which illustrate the relative attractiveness (based on visual perceptibility) of various colors, both non-fluorescent and fluorescent, to bass fish under varying light conditions and varying water color conditions. On the graphs, the percentage of times a color-trained fish responded to a colored target (the line graphs) or colored, live food (bar graphs), vis-a-vis all responses to all colors, is plotted on the ordinate, and the various colors involved in the experiments are plotted on the abscissa.

FIG. 35 is a linear chart made up of a plurality of horizontal bands of contiguous colors which collectively illustrate the colors which are most attactive to bass under each fishing condition of water clarity and light intensity.

FIG. 36 illustrates, in elevation, an instrument adapted for mounting on a boat, and portraying, in arcuate band form, the linear color chart illustrated in FIG. 35, so that the fisherman can obtain a visual indication of the color of fishing lure which should be used.

DETAILED DESCRIPTION OF A PREFERRED EMBODIMENT OF THE INVENTION

For purposes of tests and experiments conducted and leading to the evolution and development of the present invention, a number of large mouth bass, *Micropterus salmoides*, were collected from lakes and farm ponds in central and southern Oklahoma. The collected fish were maintained, pending experimentation under conditions hereinafter described, in circular, 5,000-gallon tanks. Each tank was filtered, aerated and exposed to a natural photoperiod. Water temperature was maintained at approximately 72° F. All fish were fed daily a diet of minnows and crayfish and maintained in the tanks for a period of seven days prior to the commencement of experimentation.

In the experiments and tests conducted, three experimental chambers or tanks were constructed for the purpose of testing the reactions of bass to various colors under various simulated, naturally occurring water and light conditions. For the purpose of establishing ambient light conditions over the experimental tanks which closely simulated natural light conditions encountered in fishing, natural sunlight intensity was measured at several times during the day over natural bodies of water. These measurements were then used to closely simulate these light conditions in the laboratory during the tests.

From numerous field observations and experiences, it was determined that three conditions of water clarity are generally experienced in fresh water fishing. These are clear water, muddy water and an intermediate condition in which the water is stained. Moreover, the condition of water staining, muddiness or clarity which prevails down to the first four feet in the body of water has been observed to also prevail at most depths in the water therebelow at which fishing will be carried out. This is a generality which holds for most relatively undisturbed large lakes, and thus will be true for most bass fishing experiences. The state of water clarity (clear, stained or muddy) can be repeatably identified by the use of a Secchi disc in the manner hereinafter described.

A Secchi disc is an instrument which is widely utilized in the physical analysis of water, and its character and its employment for measuring water clarity are described on page 260 of *Freshwater Fishery Biology*, William C. Brown Company (publishers of Debuque, Iowa), Karl F. Lagler, author, Copyrighted 1952, 1956, with the first printing on Sept. 15, 1956. The explanation of the use of the Secchi disc and a picture of it are set forth in Chapter 19 on page 260 of this publication. The clarity or water turbidity is conventionally determined by the use of a Secchi disc.

For purposes of color identification or definition, the denomination of color used by Pantone, Inc., of Moonachie, N.J., in its Pantone ® Color Formula Guide, 17th Edition, were utilized as a reference base. Table I shows the Pantone and United States General Services Administration correlation to the colors identified in the following description.

TABLE I

| Color and Symbol | PANTONE | GSA |
|---|---|---|
| Non-Fluorescent | | |
| Red (R) | 185C | |
| Black (BK) | | |
| Gold (GD) | 872C | 17043 |
| Silver (S) | 877C | 17178 |
| White (W) | | |
| Orange (O) | 151C | 22510 |
| Yellow (Y) | Yellow C | |
| Purple (P) | 266C | |
| Blue (BL) | | |
| Gray (GY) | 421C | 26492 |
| Green (GN) | 369C | 34230 |
| Fluorescent | | |
| Orange (O) | 811 + C | 38903 |
| Yellow-Orange (Y-O) | 818C | |
| Yellow-Green (Y-GN) | 823C | |
| Red-Orange (R-O) | 805 + C | |
| Green (GN) | 802 + C | |
| Blue (BL) | 801 + C | |

EXPERIMENT 1

Color Discrimination

One of the experimental chambers consisted of a rectangular, clear plastic tank, 48 inches in length by 24 inches in width by 24 inches in depth. A vertically sliding, opaque plastic door was used to partition the experimental tank into two compartments of substantially equal size. A circular target 2 inches in diameter was used in various ways to train the fish to strike. The circular target was suspended in the experimental tank by means of a clamp system.

In this first experiment, the water used was clear water, and the light exposure was approximately equivalent to that which prevails on an average summary day at mid-morning with a clear sky.

One bass measuring 15 cm. in total length was trained to strike a colorless Plexiglass ® target. Each time the bass struck the target, it was awarded a worm. After a period of five days with ten trials per day, the bass would strike the target within less than six seconds after the target was lowered into the tank.

Following this training period, a positive stimulus which was a non-fluorescent blue (BL) disc-shaped target was used in conjunction with a negative stimulus target which was a non-fluorescent green (GN) disc-shaped target. No reward was given for striking the negative stimulus, green target. Each experiment was begun as soon as the Plexiglas ® sliding door was raised so as to expose to the bass the target immersed in the tank on the opposite side of the Plexiglas ® door. Each of the blue and green targets was presented to the bass in the water of the tank in alternating fashion ten times each day for a period of ten days. The times required for the bass to strike each of the targets when each was presented to the bass were measured, and the ten trials with each target during each day were averaged to give an average response time upon each of the ten days. Each target exposure, constituting a sub-part of the experiment, was terminated at the time the bass struck the target, or after one minute had elapsed if the bass had not struck the target during that time.

The data collected in this experiment are plotted in FIG. 1. The training days are shown on the abscissa and the response times, in seconds, are shown on the ordinate. The data show that the bass can easily discriminate between blue and green.

At the beginning of the experiment, the response time to blue and green was relatively similar. Thus, before training, the bass apparently did not have an inherent preference for one color over another, and could apparently see the two colors equally well. As the days of training continued, however, the bass became more and more responsive to the blue, positive target and more aversive to the green, negative target. These data strongly suggest that the bass can see color, and can easily discriminate between the colors blue and green, both of which are of relatively short wavelength. In this particular experiment, the blue had a wavelength of 480 nm and the green had a wavelength of 540 nm.

EXPERIMENT 2

Color Sensitivity

A series of experiments were conducted to determine how well the bass can see various colors, and how well the bass can discriminate between these various colors and the color green. In these tests, non-fluorescent colors were tested, and included green (GN), red (R), orange (O), yellow (Y), blue (BL), bluegreen (BL-GN), light green (LGN) and dark green (DGN). The rectangular tank with the sliding opaque, Plexiglas ® partitioning door was used. The light intensity at the surface of the water in the tank (ambient light) was adjusted to be equivalent to that characteristic of mid-morning on a summer day with a clear sky, and clear water was used. A bass fish measuring 25 cm. in length was trained to strike a colorless target for five days. Following this training, the bass was then trained on a green disc-shaped target. In the case of training to strike either the colorless or green target, the bass was rewarded with a worm to provide a positive stimulus when he would strike the target.

Concurrently with the training of the bass to strike the green target, the bass was exposed to a red target as a negative stimulus and was not rewarded if the red target was struck. The training on the green and red targets continued for a period of six days with ten trials daily on each of the alternated green and red targets. After the sixth day, the negative stimulus target was changed to a different color on each of the succeeding three days with changeouts after such three day intervals to a different color for a total period of eighteen days. Throughout the experiments, however, the color green remained the positive stimulus for which a reward was offered.

Figure 2:
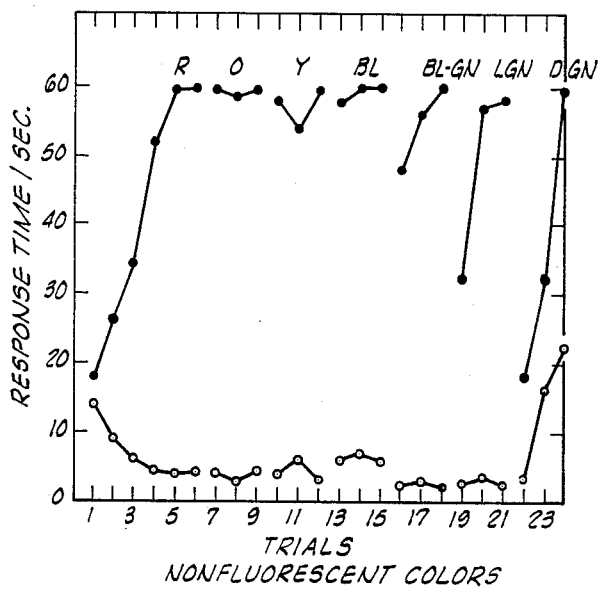
FIG. 2 is a graph with ordinate and abscissa showing the same parameter units as used in FIG. 1, but illustrating the manner in which a bass fish was able to discriminate between a green object, and several differently colored objects.

The data obtained in these tests are graphically portrayed in FIG. 2. The data shows that the bass would not respond to the red colored target (negative stimulus) after a period of five days, but by that time was responding to the positive stimulus target (green) within approximately four seconds. The data further shows that the bass was sufficiently sensitive to all of the colors tested that all of the targets were struck at some time period after being exposed, including the short and long wavelength colors, and the data further shows quite clearly that the bass could discriminate between green and the various other colors which were tested. It will be noted, however, that the closer the negative stimulus color resembled green (in terms of human vision and wavelength), the more difficult it apparently became for the bass to discriminate and strike the green target to which it was trained. This behavior was particularly evident the first day of exposure to a new color which closely resembled the green, positive stimulus. After the second and third day, however, the bass either would not respond, or responded very slowly, to the negative stimulus color, even though the colors being tested were similar. This is most apparent in the case of the light green and dark green shades of the basic green color to which the bass was trained with positive stimulation. Collectively, the tests here conducted show that the bass is capable of discriminating between a wide array of colors, and can even discriminate relatively well between different shades of the same color.

EXPERIMENT 3

Color Sensitivity and Discrimination Using Fluorescent Colors

Using the same experimental set-up which was used in Experiment 2., a bass measuring 16 cm. in total length was initially trained for a period of five days to strike a colorless target. Following this training, the bass was trained to strike a fluorescent green target by rewarding the bass with worms to provide a positive stimulus, and concurrently, was exposed to a fluorescent red-orange negative stimulus in which no reward was offered. This training on the green target, and counter offering of the red-orange negative stimulus target, was continued for a period of six days with ten trials being carried out on each of the positive and negative stimulus targets daily. Following the sixth day, the negative stimulus target was changed to a different fluorescent color every three days for the next eighteen days. Throughout this time, and conducting ten trials on each target (the positive stimulus and negative stimulus) daily, fluorescent green remained the positive stimulus with reward, whereas the alternate fluorescent color tried each day was not rewarded when exposed and struck by the bass. The object of the experiments was to determine the reaction of bass to exposure to various fluorescent colors.

Figure 3:
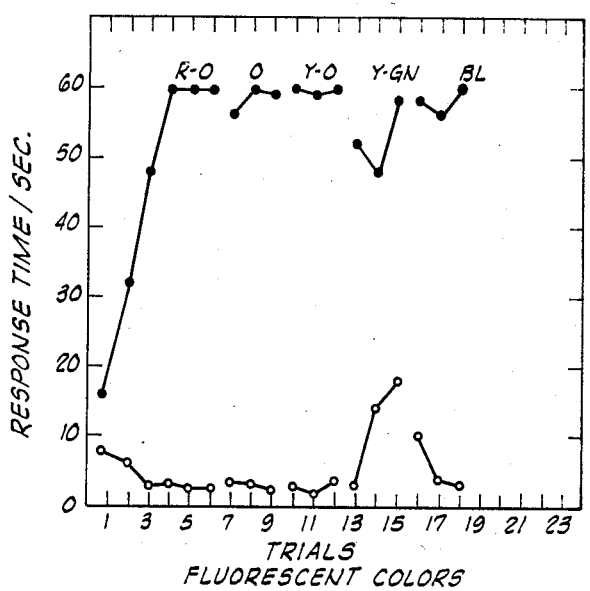
FIG. 3 is a graph with ordinate and abscissa showing the same parameter units as used in FIG. 1, but illustrating the ability of bass to visually discriminate between a fluorescent green color and certain other fluorescent colors.

The results of the fluorescent sensitivity and discrimination tests are shown in FIG. 3 where each data point represents the average of the ten trials conducted in a given day. The sequence of days from one through eighteen is indicated on the abscissa of the graph, and the response time in seconds is indicated on the ordinate of the graph.

As shown by the plotted data in FIG. 3, the bass would strike the green target, after the second day, in approximately 3.5 seconds. After three days of training on the negative stimulus constituted by the red-orange target alternated with the green target, the bass would no longer strike the red-orange target within one minute.

The behavior of the bass continued to be similar to its behavior toward the alternately exposed green and red-orange targets when the bass was tested with orange and yellow-orange as the negative stimuli targets. A slight modification in behavior occurred, however, when the negative stimulus target was changed to yellow-green. Here the bass apparently had some initial difficulty in discriminating between these two fluorescent colors for the first two days, and apparently became less sure of the positive stimulus green target on the second and third days of exposure. The bass, while slightly tentative on the first day in discriminating between the blue target and green target, quickly became able to clearly discriminate between these two colors on the second and third days.

As was evident with the non-fluorescent colors, the bass can effectively discriminate among the different fluorescent colors, as well as shades of similar fluorescent colors.

EXPERIMENT 4

Color Perception and Selectivity Under Differing Light and Water Conditions

In a series of tests, bass fish were trained by placing them in a circular 8000-gallon tank having a diameter of 14 feet and having water therein to a depth of 36 inches. A series of eleven differently colored plates were symetrically placed in circumferentially spaced positions around the inside wall of the tank. A copper wire grid system was placed on the bottom of the tank to provide a mechanism by which a mild shock could be produced to the fish when it positioned itself in front of any one of the colored plates.

In the test here conducted, an experimenter would approach the tank five times during the day and ring a bell. A period of thirty seconds was allowed to elapse in order to accord the bass time to position itself within the tank. This position would be more closely adjacent to some one of the colored plates placed symmetrically around the periphery of the tank than to any of the other colored plates. If the fish positioned itself in front of one of these colors which it was not being trained to respond, then a mild shock was imparted to the fish. However, if the fish positioned itself in front of the color to which it was being trained to respond, then the bell was again sounded but no shock was given. Five of the bass were trained to each of the eleven colors.

This training continued daily until the behavioral responses of the fish stabilized—that is, upon the initial ringing of the bell upon the approach of the experimenter, the fish would immediately swim to, and position itself before, its correct training color.

Some of the fish responded to the training more rapidly than others, and within twenty days would respond repeatedly to the ringing of the bell by positioning themselves in front of the particular color to which they were being trained. Others of the specimens required in excess of forty days of training until the bass would move quickly and unerringly into the water zone in front of its particular training color.

After all of the fish had been trained to respond favorably to a selected, positive stimulus color in the presence of ten other colored plates located around the inside of the tank, and five fish so trained had been individually trained to each of the eleven different colored plates in preference to the other colors, the ambient light factor (the quality and quantity of light impinging upon the surface of the water) and the water clarity were similarly each manipulated to simulate the environmental conditions under which fish would most frequently be sought by the fisherman in the natural habitat of the fish. Thus, the environmental variables which were controlled, in various combinations as hereinafter described, were the water clarity in terms of whether the water is clear, is stained or is muddy; and the ambient light in terms of whether the light conditions at the surface of the water were to correspond to that encountered in the early morning on a summer day with (a) a clear sky or, (b) an overcast sky, with the same clear and overcast conditions simulated for mid-morning, noon, mid-afternoon and evening. Some tests were also carried out under night fishing conditions.

For the purpose of determining the water clarity, a Secchi disc was utilized. A vertical cylinder five feet in length and closed at the bottom was filled with the water to be used in the tank and employed for receiving the lowered Secchi disc in evaluating the clearness of the water. Where the disc remained visible, upon lowering into the water in the cylinder, over an interval of more than four feet of depth, this was taken as indicating the condition of the water as clear. Where the Secchi disc remained visible for more than two feet but disappeared before a depth of four feet, a stained water condition was indicated. Where the disc disappeared from view in less than two feet, the condition of the water was identified as muddy.

To simulate environmental light conditions, actual light intensity measurements were made at the times of day and under the sky conditions described in an outdoor over-lake environment, on several summer days, and these conditions then averaged for the respective times of day and sky conditions. The light conditions thus determined were then reproduced over the experimental tanks. In sum, conditions were established which simulated the following natural conditions apt to be encountered by the fisherman:

TABLE II

I. Clear water (4 ft. visibility and greater)
  1. Early morning (5:00–6:00 a.m.)
     a. Clear sky
     b. overcast sky
  2. Mid-morning (9:30–10:30 a.m.)
     a. clear sky
     b. overcast sky
  3. Noon (12:00–1:00 p.m.)
     a. clear sky
     b. overcast sky
  4. Mid-afternoon (3:30–4:30 p.m.)
     a. clear sky
     b. overcast sky
  5. Evening (7:30–8:30 p.m.)
     a. clear sky
     b. overcast sky II. Stained water (2–4 ft. visibility)
  1. Early morning (5:00–6:00 a.m.)
     a. clear sky
     b. overcast sky
  2. Mid-morning (9:30–10:30 a.m.)
     a. clear sky
     b. overcast sky
  3. Noon (12:00–1:00 p.m.)
     a. clear sky
     b. overcast sky
  4. Mid-afternoon (3:30–4:30 p.m.)
     a. clear sky
     b. overcast sky
  5. Evening (7:30–8:30 p.m.)
     a. clear sky
     b. overcast sky III. Muddy water (2ft. visiblity or less)
  1. Early morning (5:00–6:00 a.m.)
     a. clear sky
     b. overcast sky
  2. Mid-morning (9:30–10:30 a.m.)
     a. clear sky
     b. overcast sky
  3. Noon (12:00–1:00 p.m.)
     a. clear sky
     b. overcast sky
  4. Mid-afternoon (3:30–4:30 p.m.)
     a. clear sky
     b. overcast sky
  5. Evening (7:30–8:30 p.m.)
     a. clear sky
     b. overcast sky Each of the bass trained as described to position itself in front of a plate having a particular color was then subjected to ten trials under each of the described conditions of ambient light and water clarity (30 different conditions in all), and in the case of each of the conditions, was tested to determine its ability to orient itself in front of the color to which it was trained in ten successive trials. During each of these trials, all of the colored plates spaced circumferentially at substantially equal intervals around the internal wall of the test tank were rotated and randomly interspersed so as to remove any experimental biases which might result from the training plate being left in the same orientation relative to all the other colors during each of the successive tests.

The following colors of plates were used for all of the tests, and five bass had been trained to orient themselves before each of these colors: blue (BL), green (GN), orange (O), red (R), yellow (Y), silver (S), gold (GD), purple (P), black (BK), gray (GY) and white (W).

As the bass were observed in their responses to the bell ringing, their ability to correctly respond to the ringing of the bell by positioning themselves in front of the color to which they had been trained was considered to be a measure of their ability to see that color under the prevailing water and ambient light conditions during the test. Thus, the percentage of the times that the five bass correctly positioned themselves in front of the colored plate to which they had been trained during the total of ten trials each was the parameter by which the ability of the bass to see its training color under the imposed water and light conditions was gauged, or, stated differently, was taken as a measure of the susceptibility of the training color to being readily perceived by the bass under the particular conditions of the test.

The results of these experiments are presented graphically in the line graph portions of FIGS. 4–19.

Figure 4:
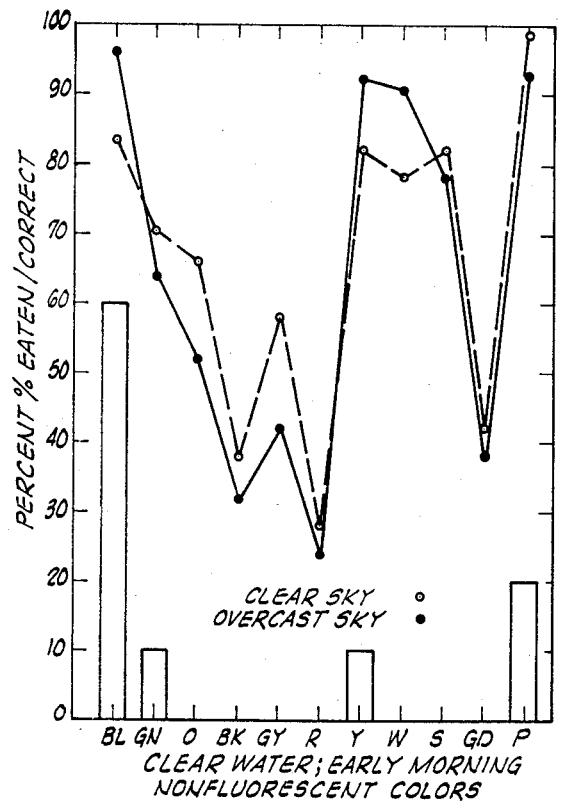

Referring initially to FIG. 4, the average of the percent of times out of the ten trials which each of the five bass correctly positioned itself in front of the respective color to which it had been trained is plotted on the ordinate. The colors which were tested, and to each of which five bass had been trained during the training period, are plotted on the ordinate. In the case of the data plotted in FIG. 4, the conditions of these tests were, in all cases, an ambient light condition corresponding to that encountered during the early morning hours of from 5:00 a.m. to 6:00 a.m., with an overcast sky, and the water was clear water as indicated by the fact that the Secchi disc could clearly be seen at a depth exceeding four feet.

As shown in FIG. 4 by the line graph, the colors which the bass could see best, as indicated by the percent of times that they positioned themselves in front of the correct color were blue (BL), yellow (Y), white (W), and purple (P). Green (GR) was also relatively well seen. The poorest responses, i.e., the most incorrect responses, were recorded for black (BK), red (R) and gold (GD) under these environmental conditions.

When the ambient light condition was changed to that of an overcast sky during an early morning fishing period, the line graph plot, also set forth in the graph of FIG. 4, indicates that sky overcast does not substantially change the response of the bass to various colors when the light is otherwise that which obtains during early morning, and the water clarity condition is clear. Under this condition of an overcast sky, however, the color to which the highest accurate response occurred was blue rather than purple.

In sum, the data set forth in FIG. 4 (without reference to the bar graph portion, to which reference will later be made) indicate that the fish can best perceive blue, yellow, white and purple under these environmental fishing conditions, and that black, gray and red (all non-fluorescent colors) are not highly visible to the fish. Relatively intermediate between the highly visible colors, and those which are not easily or readily seen are green, orange and gray under the described environmental conditions.

Figure 5:
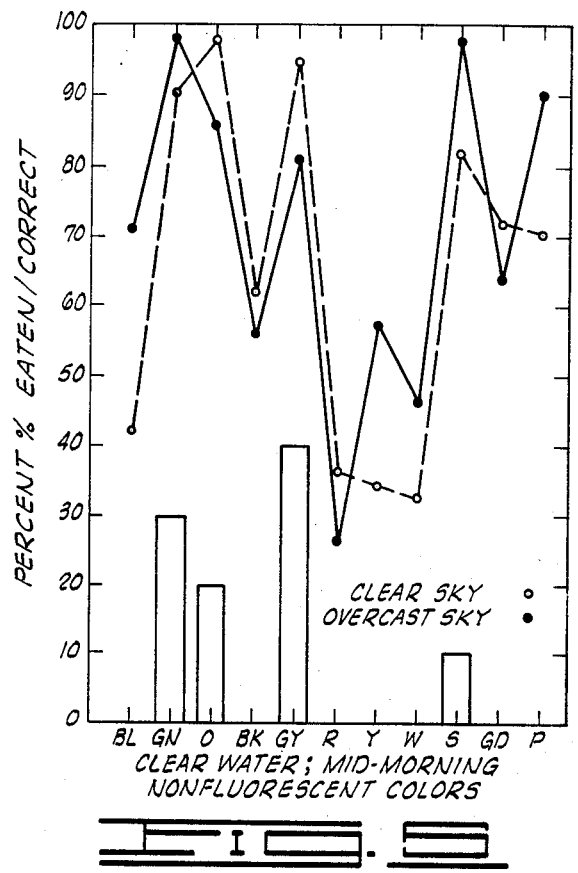

Another group of color-trained bass which had been individually trained to each of the colors used in the tests graphically portrayed in FIG. 4, were again each subjected to ten tests in which the colors were rotated and interchanged in their positions around the tank, but under conditions which simulated both clear and overcast skies during mid-morning fishing (9:30–10:30 a.m.). The tests were carried out in clear water in which the Secchi disc remained visible to a depth greater than four feet. The results of these tests are depicted in FIG. 5, and demonstrate that the colors orange, gray and green are correctly selected relatively more often by the bass under a clear sky during mid-morning fishing and in clear water. These colors were also relatively well seen when light conditions simulating an overcast sky were utilized in the tests. During such overcast sky tests, however, the bass could also see silver and purple slightly better than during the clear sky tests. Interestingly, the color blue was considerably less well seen under the mid-morning fishing condition (both clear sky and overcast sky) than in the case of the relatively high visibility of this color during the early morning fishing conditions with water of equal clarity. This was also true of white and yellow, which were not well seen during the mid-morning fishing conditions in contrast to the visibility of these colors during early morning fishing in clear water. Black, gray and gold were responded to much more favorably during the mid-morning fishing condition tests than were these colors when tested under early morning fishing conditions under similar skies and identical water clarity.

Again, and as in the case of the tests depicted graphically in FIG. 4, only a relatively slight variation was observed between the color responses which were evoked under clear sky conditions as contrasted with those displayed by the bass under overcast sky conditions; in fact, the ambient light effect upon the fish's color perception and response did not appear to be nearly so great a factor in terms of its variation due to overcasting of the sky as was perceived to occur as a result of the sun's movement from an early morning fishing condition to a mid-morning fishing condition. As was confirmed by further tests carried out, and hereinafter described, the time of day in which fishing occurred was a much more important factor in the bass' ability to discriminate between colors than were the differences resulting from creating an overcast sky condition in contrast to a clear sky condition.

Figure 6:
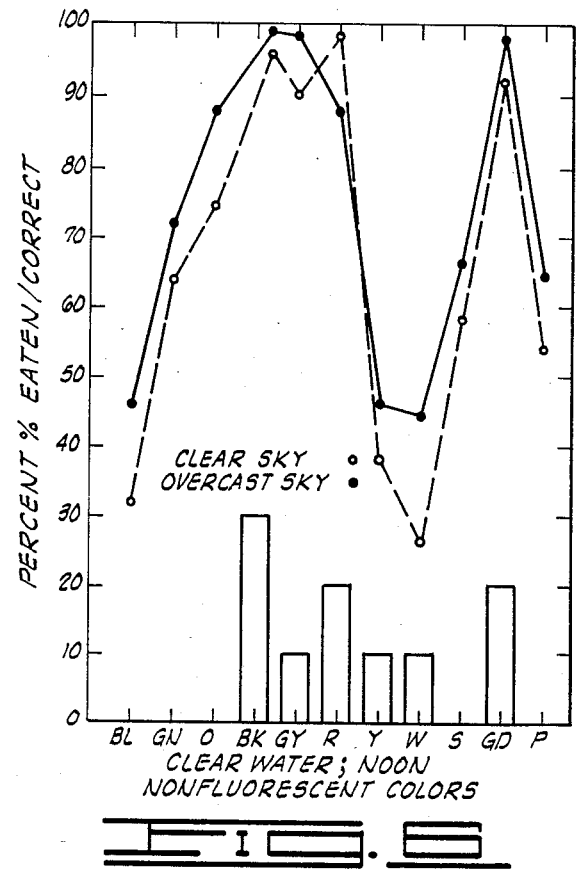
Figure 7:
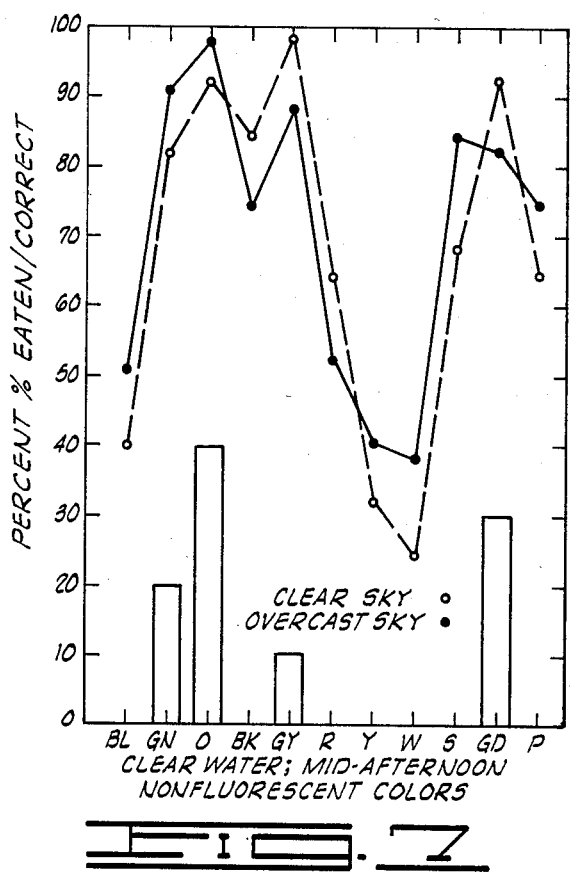

When conditions over the test tanks were created to simulate fishing at noon on a summer day in clear water, with both overcast and clear skies, a significant shift in the color perception of the bass occurred. Thus, as shown in FIG. 6 where the data obtained under these test conditions has been graphically plotted in the line graphs, it will be perceived that black, gray, red and gold were clearly the colors most visible to the bass. Orange was also relatively good. Poor responses were recorded for blue, yellow, white and purple.

Where conditions were established simulating those apertaining in mid-afternoon with clear water under both clear and overcast skies, the colored plates best perceived by the bass, as depicted in FIG. 7, were orange, gray and gold, with green being nearly as good as gold. Blue, red, yellow and white were seen relatively poorly. As might be expected, some correlation is here seen to exist to the colors best seen under mid-morning conditions.

Figure 8:
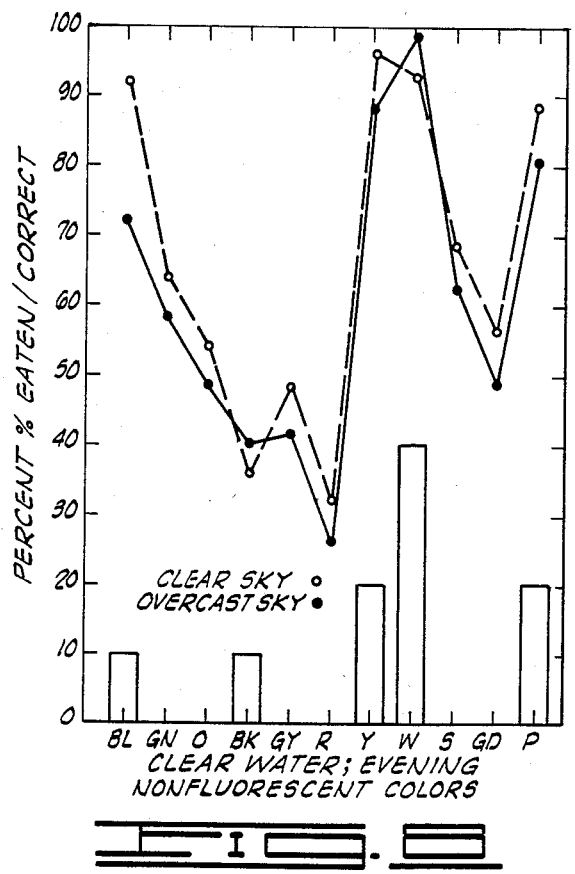

FIG. 8, in the line graph portion, depicts the response of the bass to the various colored plates when the conditions of evening or dusk fishing were established for a series of tests. Here, using clear water and again imposing both clear and overcast sky ambient light conditions, the bass saw the colors yellow and white quite well, and the colors blue and purple almost as well. The bass did not respond well to black, gray, red or gold.

Figure 9:
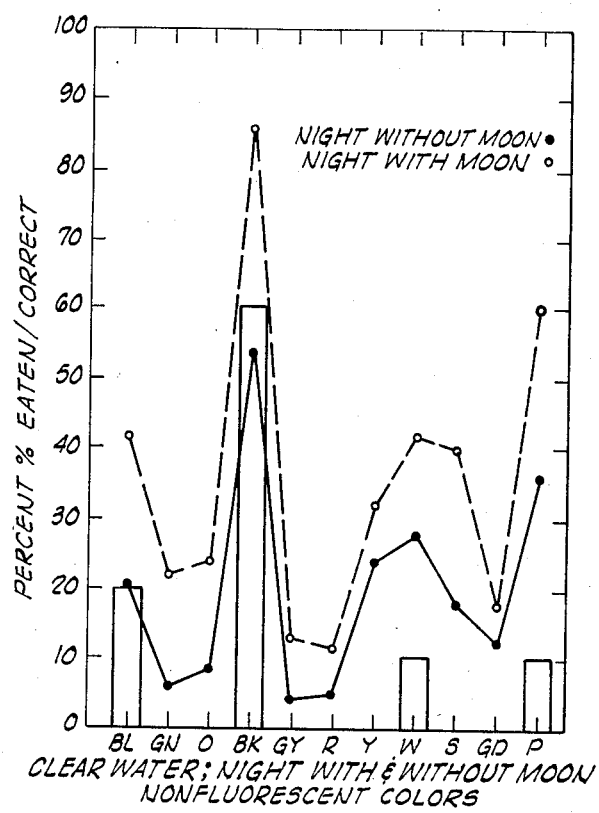

Conditions of night fishing, both with and without a moon, are depicted for a clear water condition in FIG. 9. Interestingly, the colors best seen by the bass, whether there is moonlight or not, are black and purple. The poorest colors for visibility under these conditions were green, orange, gray, red and gold.

Figure 10:
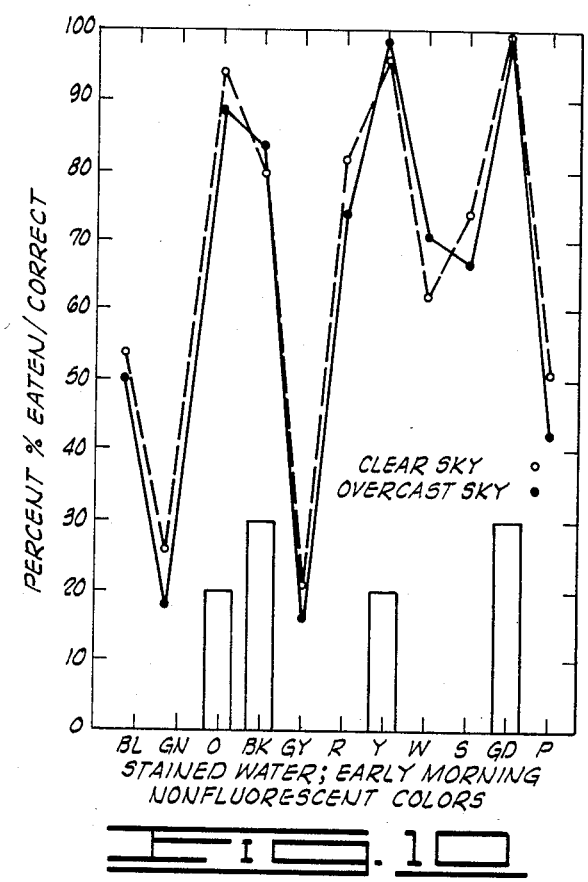
Figure 11:
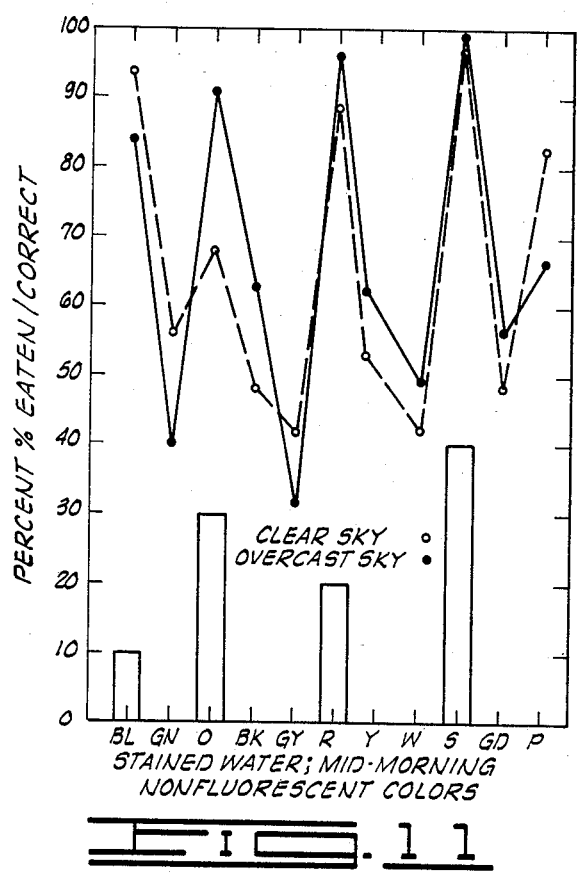
Figure 12:
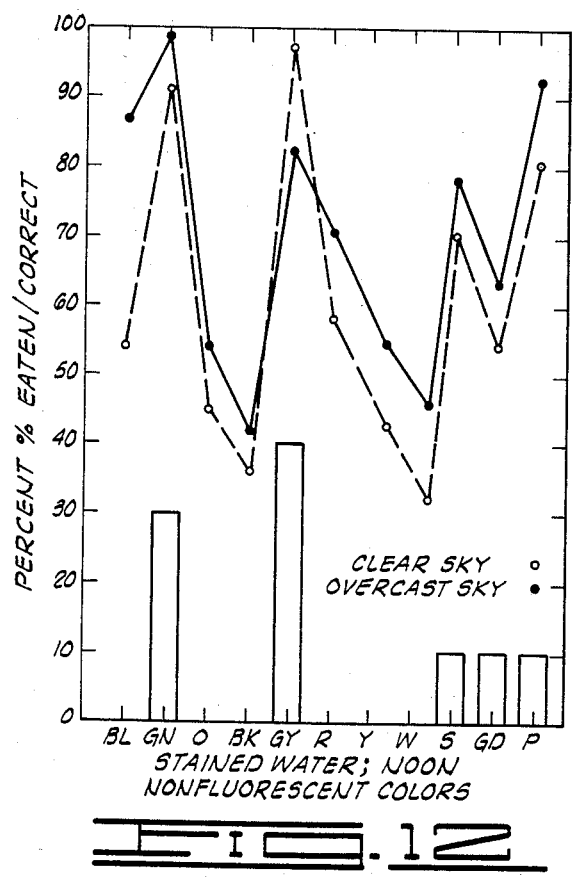
Figure 13:
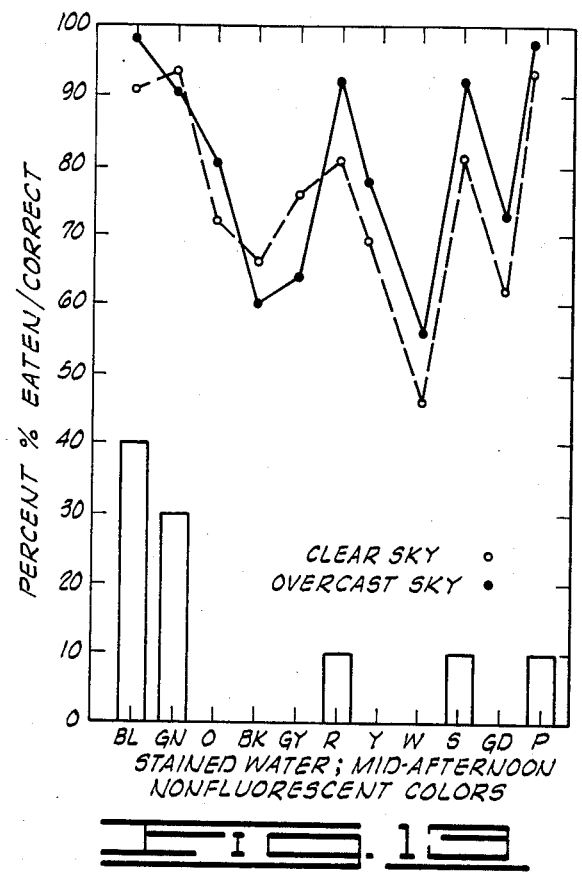
Figure 14:
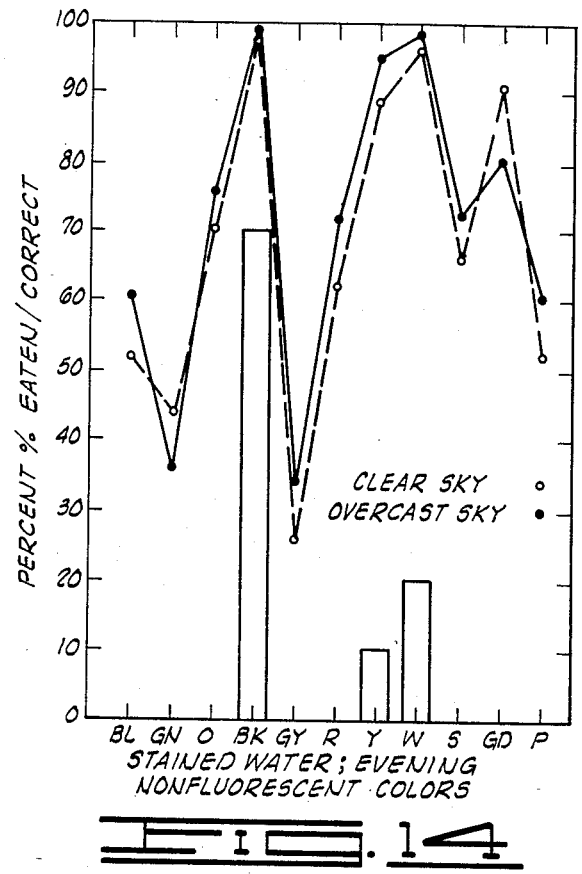
Figure 15:
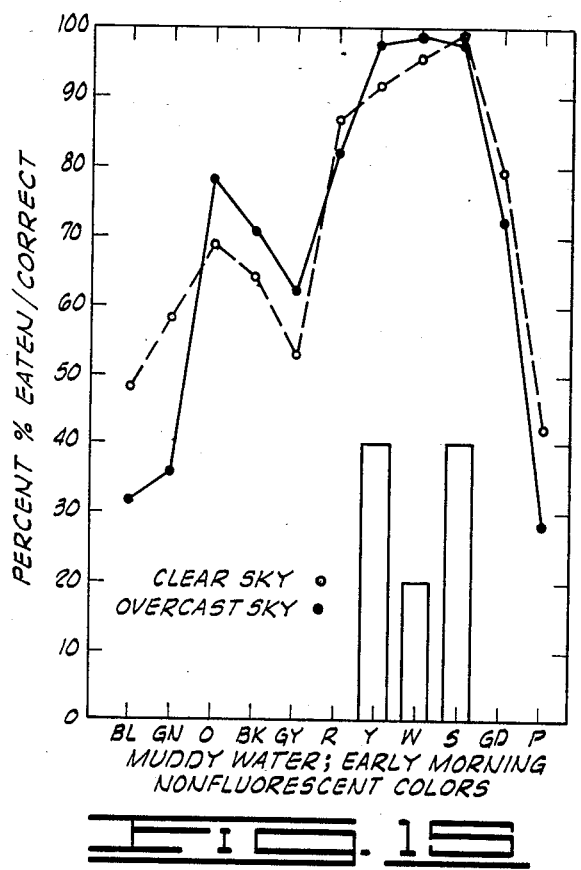
Figure 16:
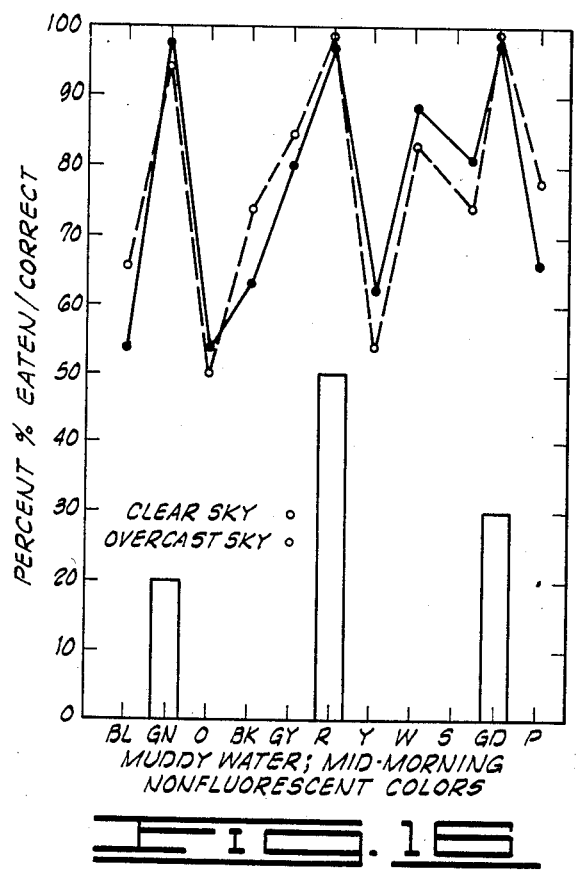
Figure 17:
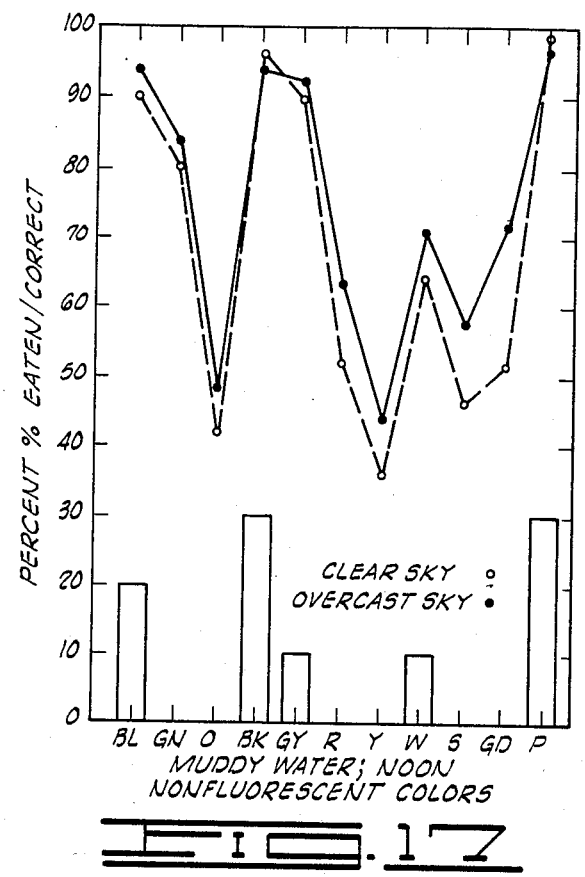
Figure 18:
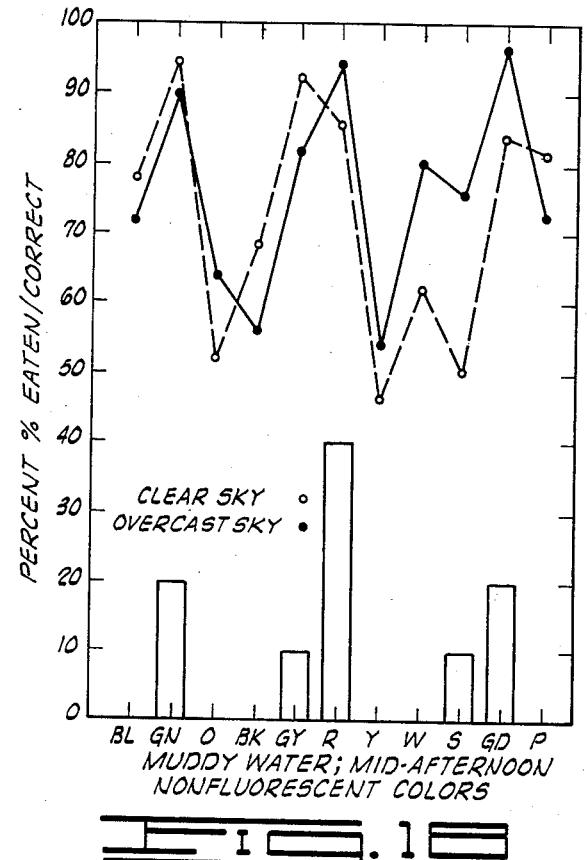

In a further series of tests, again using the eleven colored plates variously arranged relative to each other around the tank, the colors were evaluated in terms of their visibility to bass under stained water conditions (the condition under which the Secchi disc could no longer be seen after it was lowered from two to four feet in the water), and again at the particular periods of the day which have been described in referring to the clear water fishing condition used in the tests earlier herein described. These tests demonstrate, as will be explained, that the water condition, varying from clear water to stained water, significantly affects the bass' ability to perceive different colors. Thus, other and different colors are better seen by the bass under the same ambient light conditions apertaining at the same time of the day as a result of a loss of clarity in the water and the existence of a stained water condition. For example, where the early morning light conditions for both a clear sky and an overcast sky were imposed on test tanks containing stained water, the responses of the bass trained to the various colors, as shown by FIG. 10, demonstrated a marked preference for the colors orange, black, yellow and gold. This may be contrasted with FIG. 4 of the drawings where, under the same early morning clear and overcast sky light conditions, the bass nevertheless did not respond well to gold, and responded relatively poorly to both orange and black under clear water conditions.

Maintaining the stained water condition, other tests were carried out with colored plates in the circular tank for ambient light conditions which apertain at mid-morning with clear and overcast skies (FIG. 11), at noon for clear and overcast skies (FIG. 12) and for mid-afternoon (FIG. 13) and evening (FIG. 14) with clear and overcast skies in each case. As has been previously pointed out, whether the light intensity was that which simulated a clear sky at the times described or an overcast sky at those same times did not appear to affect the results of the tests significantly—in any event, much less effect was due to this variable than in the case of variations in the particular time of day at which the observations were made.

Interestingly, the staining of the water appeared to shift the most bass-visible color during evening (dusk) conditions to accord to the most bass-visible color when fishing in clear water at night with or without a moon. In other words, black emerged from the experiments as the color most visible to the bass when the water was stained and late afternoon or night conditions of ambient light were imposed, just as black was found in other tests to be the color best seen when fishing at night with or without a moon. In contrast to this, during dusk or evening fishing with either a clear or overcast sky, where the water was clear, black was a relatively poorly seen color as shown in FIG. 8.

Figure 19:
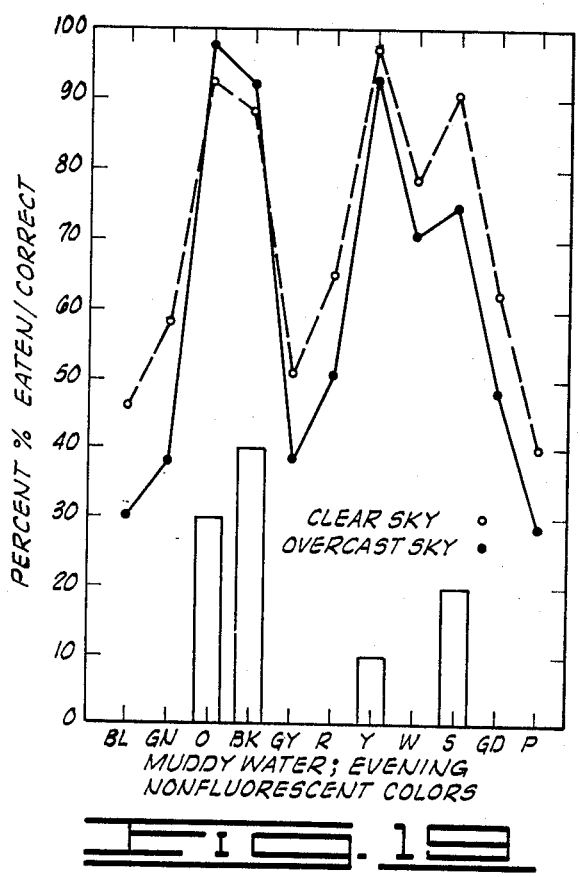

In further tests, the water condition was changed to muddy, as signified by the inability to continue to see the descending Secchi disc before the disc had been lowered two feet into the water. The muddy water condition was established again for each of the various ambient light conditions hereinbefore described, including those apertaining at early morning, mid-morning, noon, mid-afternoon and evening under both clear and overcast skies. The results of these tests are depicted by the line graph portions of FIGS. 15–19. As there shown, yellow, white and silver were best seen by the bass in early morning light in muddy water; red, green and gold were best seen in mid-morning light in muddy water; blue, black and purple were best seen in the more intense light of noon, and green, red and gold were best perceived in mid-afternoon ambient light. Interestingly, these latter colors were also those which were best seen by the bass under mid-morning light conditions. At dusk, in muddy water, the tests indicated that the bass see orange, black and yellow best, and have difficulty in perceiving blue, purple and gray (FIG. 19).

EXPERIMENT 5

Colored Live Food Preferences of Untrained Bass

This series of experiments was carried out to determine the reactions of untrained, hungry bass to actual live crayfish which had been variously painted on the carapace portion of their bodies. In these tests, a generally rectangular fiberglass tank measuring 24 inches wide and 180 inches long and 30 inches in height was used. The depth of water in the tank was 24 inches. An opaque Plexiglas ® sliding door partitioned the experimental tank into two chambers. At one end of the tank, over one of the chambers, a release trough was suspended above the chamber. The release trough allowed eleven crayfish of different colors to be released into the test chamber simultaneously. The colors used were non-fluorescent colors and corresponded to those previously used in the colored plate tests described above.

The bass being tested were separated by the sliding door from the chamber into which the crayfish were released. Each bass used in these experiments was given no previous training, and food had been withheld from the bass a sufficient period of time to assure a ready inclination to strike the natural food.

The bar graph portions of FIGS. 4–19 depict the results of these tests. The percentage of the crayfish of different colors which were eaten during the ten trials, each of which involved a different untrained hungry bass, is plotted on the ordinate, and the several colors of the crayfish are shown along the abscissa. Again, the ten trials were repeated for each of the water and ambient light conditions previously described. Thus, for example, in FIG. 4, there is depicted in the bar graph portion of this figure, the reactions of the bass to exposure to variously colored crayfish in clear water, and with the ambient light conditions developed to simulate those prevalent in early morning fishing under both clear and overcast skies. It will be perceived, in referring to this portion of FIG. 4, that blue crayfish were clearly preferred by the bass, with purple crayfish being those which were next most frequently eaten. Green and yellow crayfish were also seen and eaten.

Interestingly, the reaction of the untrained bass to live food carrying the various colors tested correlates quite well to the reaction of trained bass to the randomly arranged colored plates which were used in the experiments previously described. The two tests taken together appear to indicate that variations in light and water conditions have an effect on the colors seen well by the bass which masks or overrides any natural preference the bass might exhibit for a natural food species of a particular color.

The color sensitivity of the bass feeding on the colored live crayfish under conditions prevailing at midmorning in clear water indicated that the bass were most attracted to green, orange, gray and silver. This correlates well with the color sensitivity of bass as determined in the colored plate experiments earlier discussed. The bass did not, however, eat the purple crayfish, contrary to the indications of the colored plate sensitivity test. Although the bass selected the gray colored crayfish forty percent (40%) of the time, the colored plate sensitivity index for the color gray had been determined to be slightly lower than the colored plate sensitivity indices for green, orange and silver. In accordance with the prior colored plate sensitivity tests, no crayfish which were blue, black, red, yellow, white or gold in color were consumed by the bass under the environmental conditions appertaining in the test plotted in FIG. 5 of the drawings.

At noon under clear water conditions, the sensitivity of the bass was found to be most positive with respect to black, gray, red, yellow, white and gold crayfish (FIG. 6). The colored plate sensitivity values obtained in the case of the black, gray, red and gold plates, as determined in the experiments previously discussed had, in each case, exceeded ninety percentile. In sum, under conditions of clear water at noon with alternated clear and overcast sky conditions, the bass consumed either black, gray, red or gold colored crayfish eighty percent (80%) of the time. The reason why some of the yellow and white crayfish were consumed, considering the poor reaction of bass to proper identification and positioning in front of these colored plates in the colored plate experiment, is not presently understood.

In mid-afternoon in clear water, and with varying overcast or clear sky conditions, the bass preferred the green, orange, gray and gold colored crayfish, with orange being the most preferred and gold being next preferred. This preference, graphically portrayed in FIG. 7, shows excellent correlation to the color sensitivity and perception tests carried out with the colored plates in Experiment 4.

Under conditions encountered during dusk or early evening fishing in clear water, as portrayed in FIG. 8, the bass preferentially consumed the blue, black, yellow, white and purple crayfish. Green, orange, gray, red, silver and gold colored crayfish were not eaten.

The reaction of the bass to nighttime, clear water fishing conditions was interesting because of the fact that the bass indicated a clear preference for the black crayfish, and also ate significant numbers of the white crayfish. Blue and purple crayfish were also eaten in significant numbers. Again, these observations correlate quite well with the colored plate discernment tests which had been previously carried out.

FIGS. 10-19 of the drawings show the colored crayfish experiments repeated, but varying the water condition to utilize stained and muddy water. These tests yielded data corroborating the color perception characteristics of the bass as suggested by the colored plate experiments.

EXPERIMENT 6

Visibility of Fluorescent Colors

A similar set of tests was carried out to determine the sensitivity of the bass to a number of fluorescent colors under various conditions of water clarity, hours of the day and conditions of the sky with respect to a number of fluorescent colors. Again, in the initial tests of fluorescent colors, a series of colored plates spaced around the inside wall of the circular tank were utilized as before, after the bass had been trained to a particular fluorescent color. The fluorescent colors utilized were red-orange (R-O), orange (O), yellow-green (Y-GN), yellow-orange (Y-O), blue (BL) and green (GN). After the training period on the various fluorescent colors to the exclusion of other colors, the colors were then shifted, the water clarity and ambient light conditions varied as previously described, and the bass observed during the bell ringing tests to determine the percentage of the ten trials during which the bass could correctly locate and place itself in front of the fluorescent color to which it had been trained.

In a second group of tests, the colored crayfish live food experiment was repeated, except that the live crayfish were painted with one of the described fluorescent colors. Again, the bass used in these tests had not undergone any color training.

The results of the data obtained in these two sets of tests are set forth in FIGS. 20-34, with the bar graph portion of each of the graphs showing the responses of the bass to exposure to the multiplicity of crayfish of different fluorescent colors, and the line graph portion of each graph depicting the results obtained during the colored plate tests.

Figure 20:
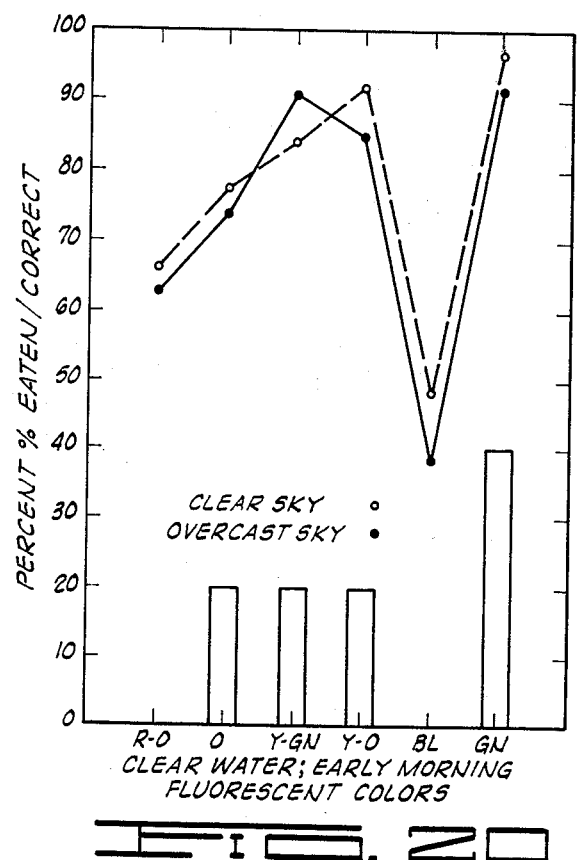
Figure 21:
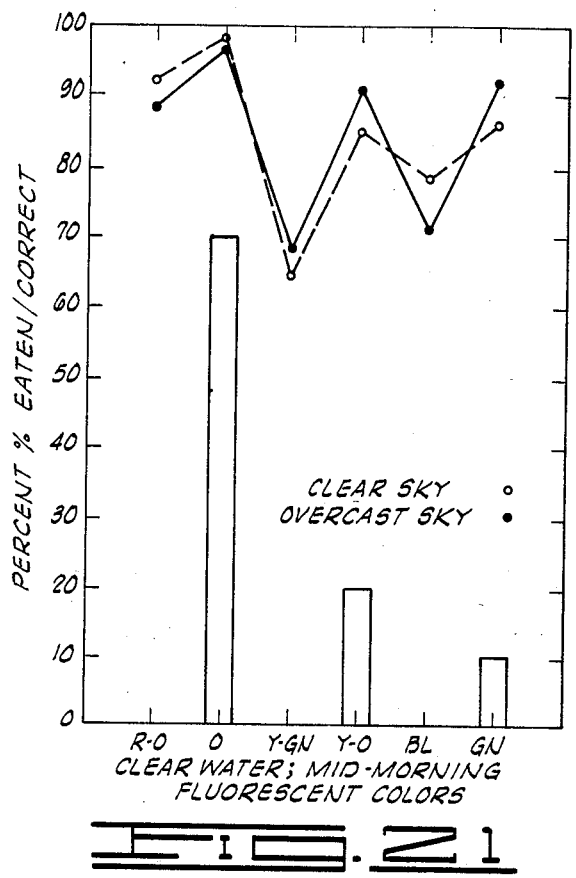
Figure 22:
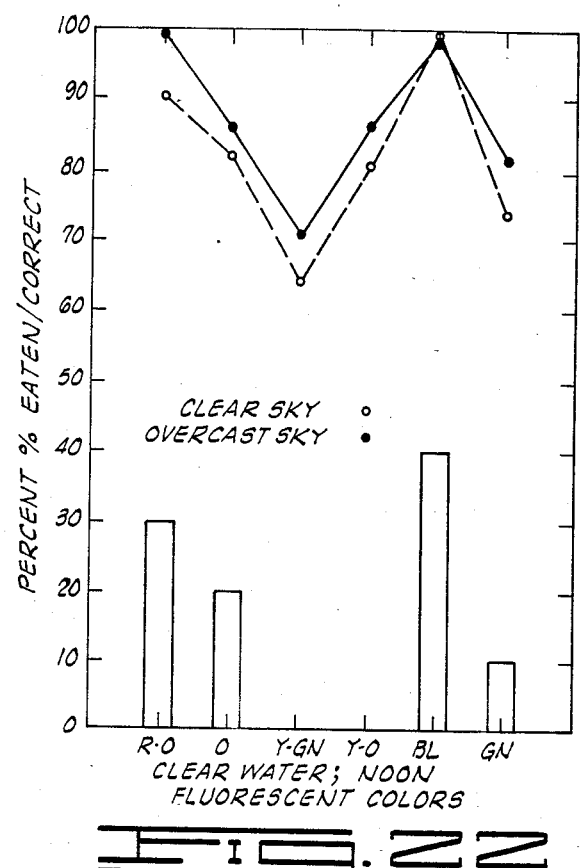
Figure 23:
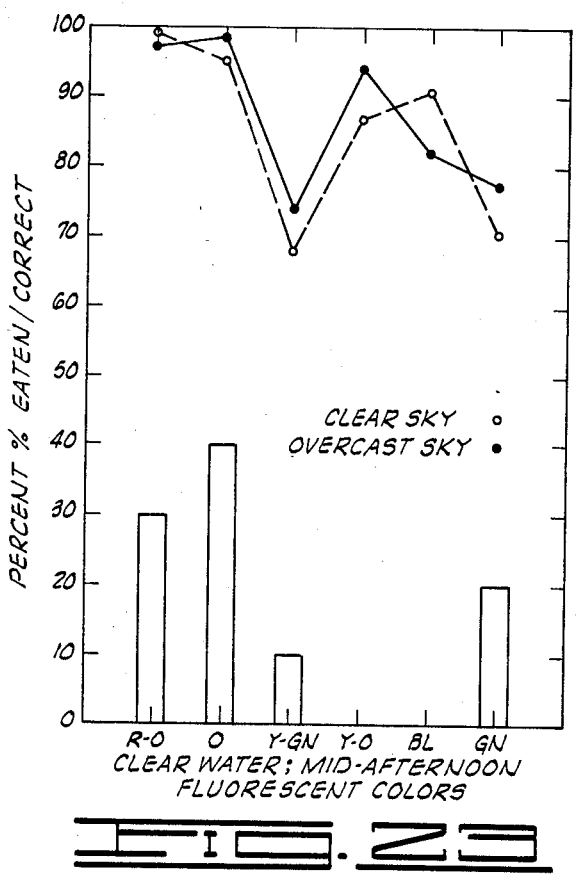
Figure 24:
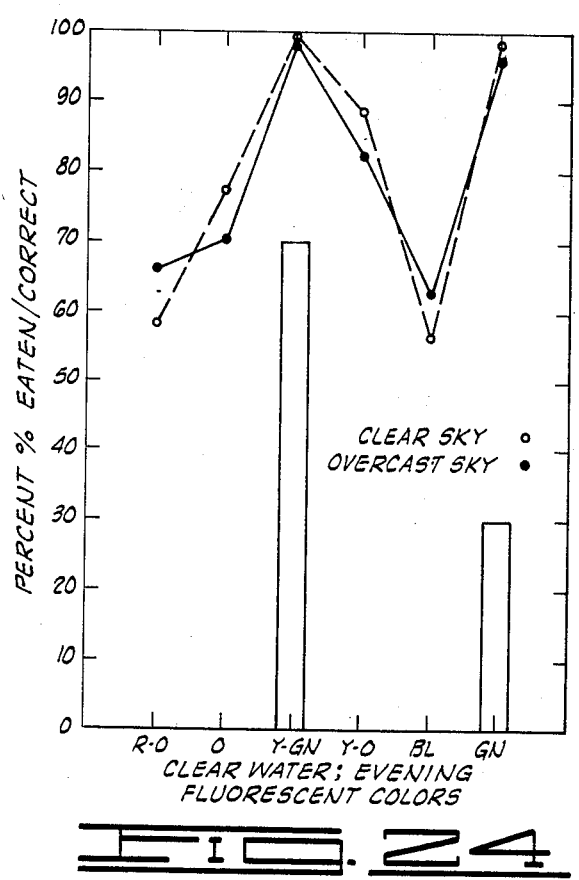
Figure 25:
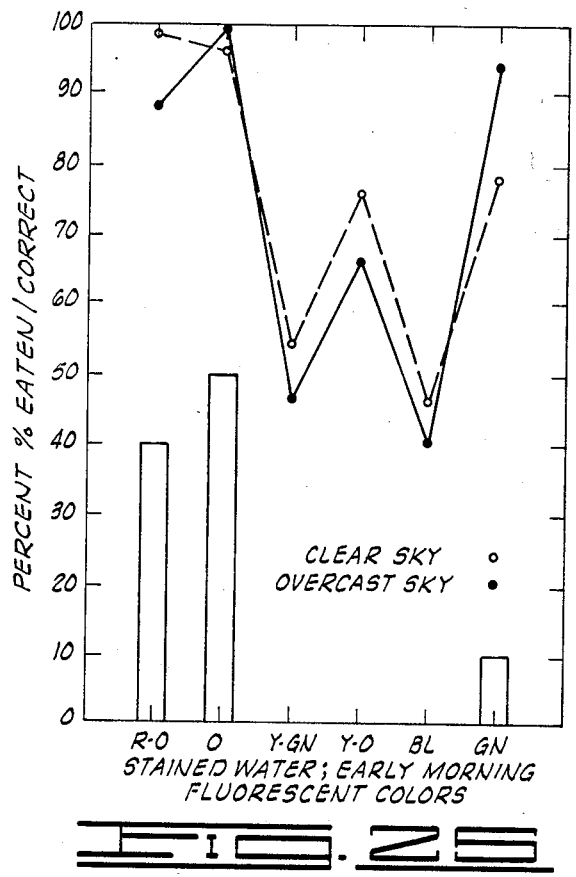
Figure 26:
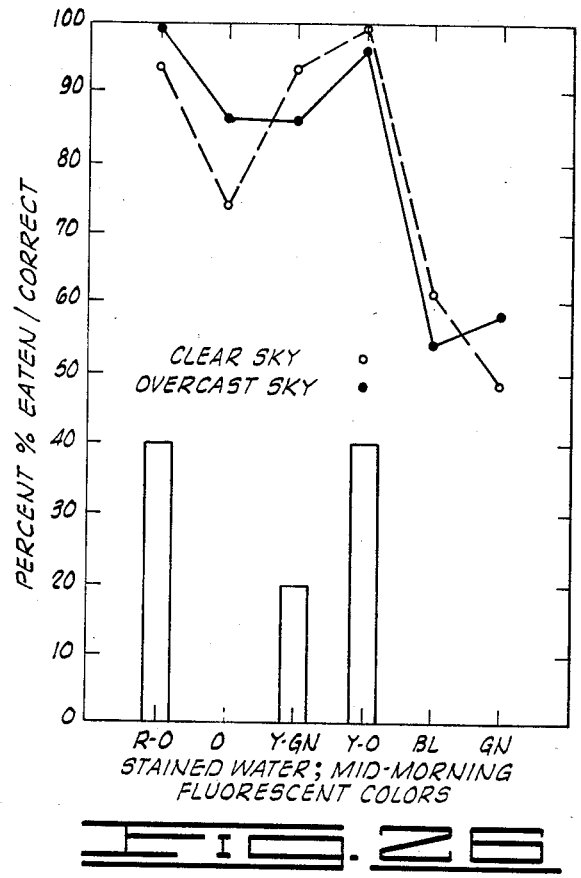
Figure 27:
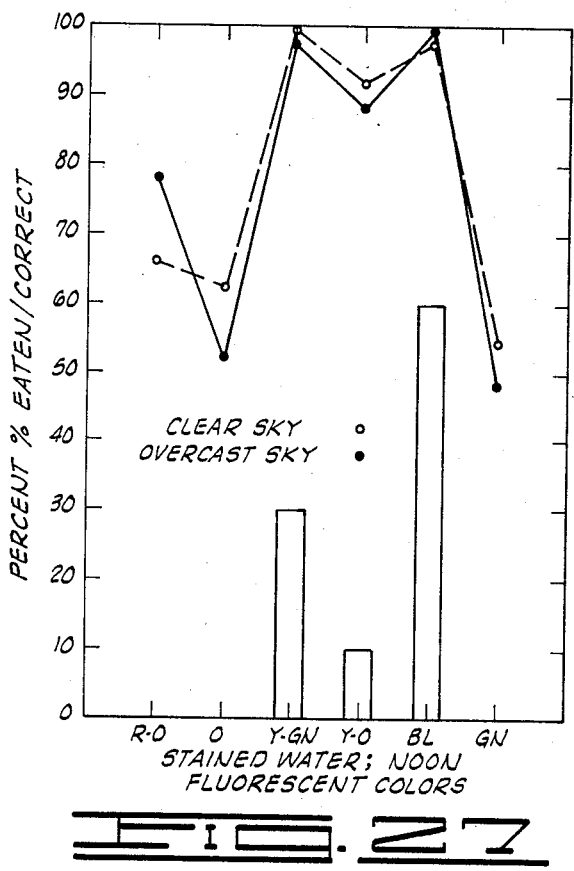
Figure 28:
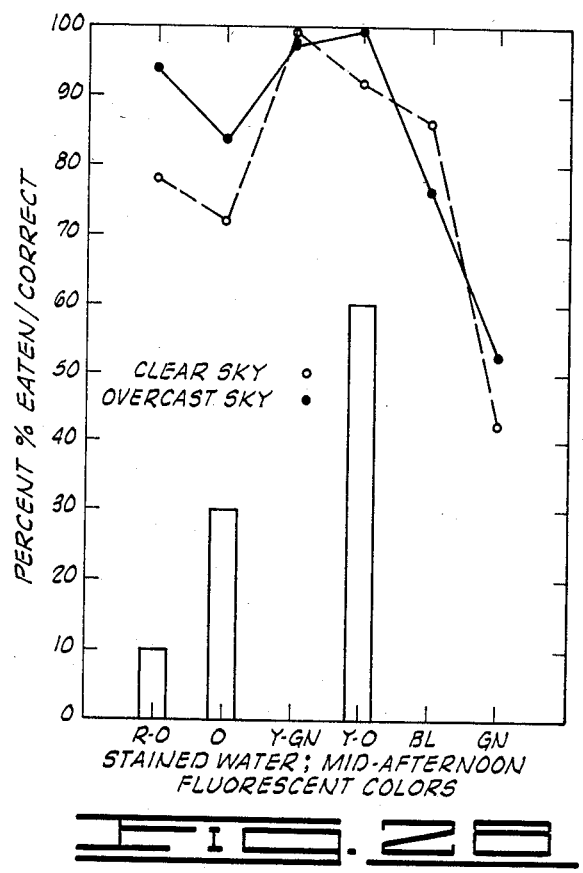
Figure 29:
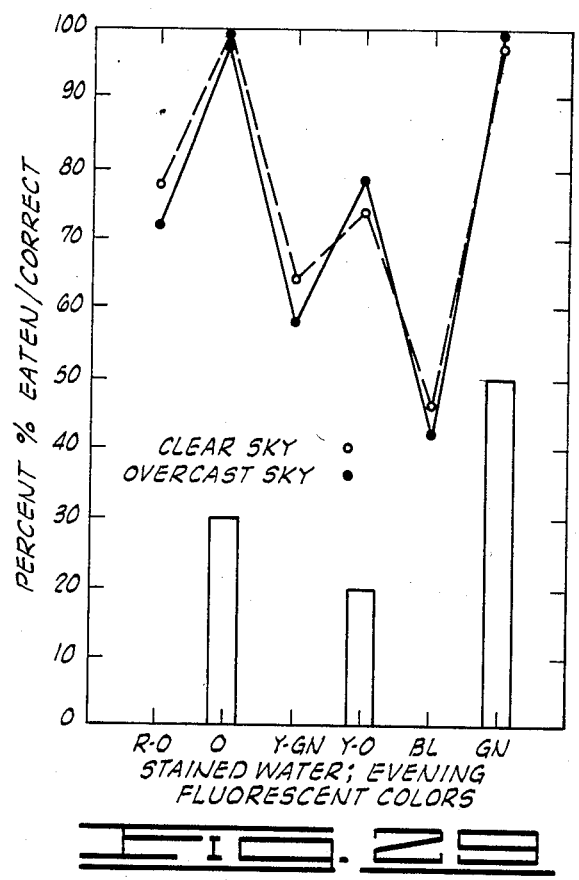
Figure 30:
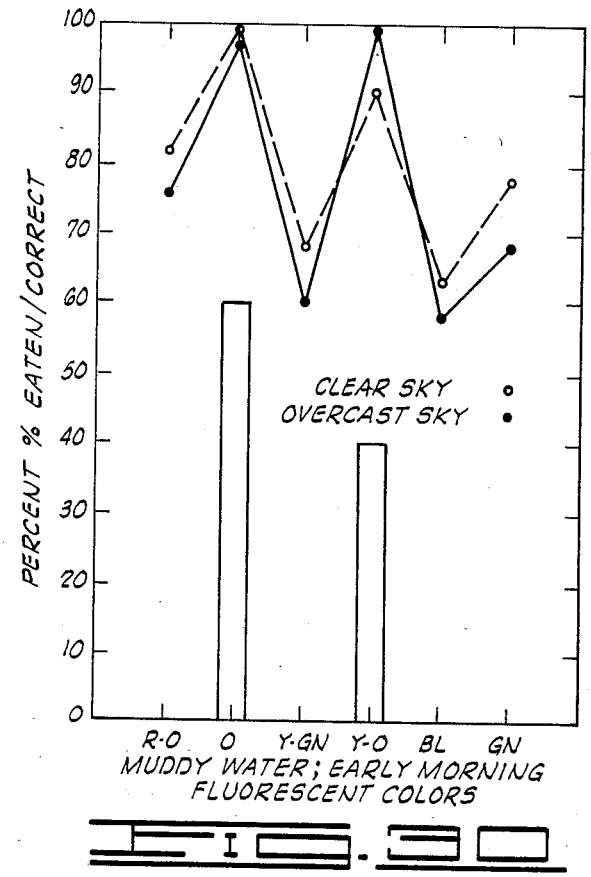
Figure 31:
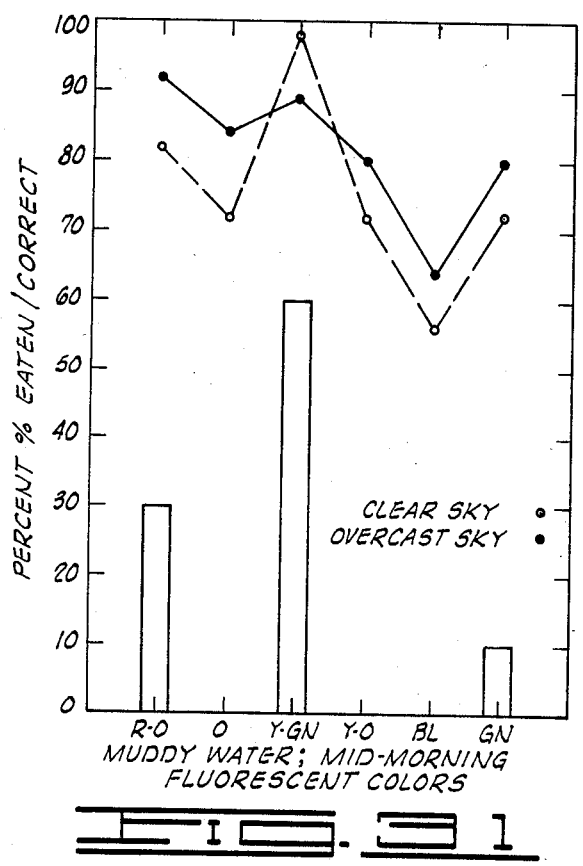
Figure 32:
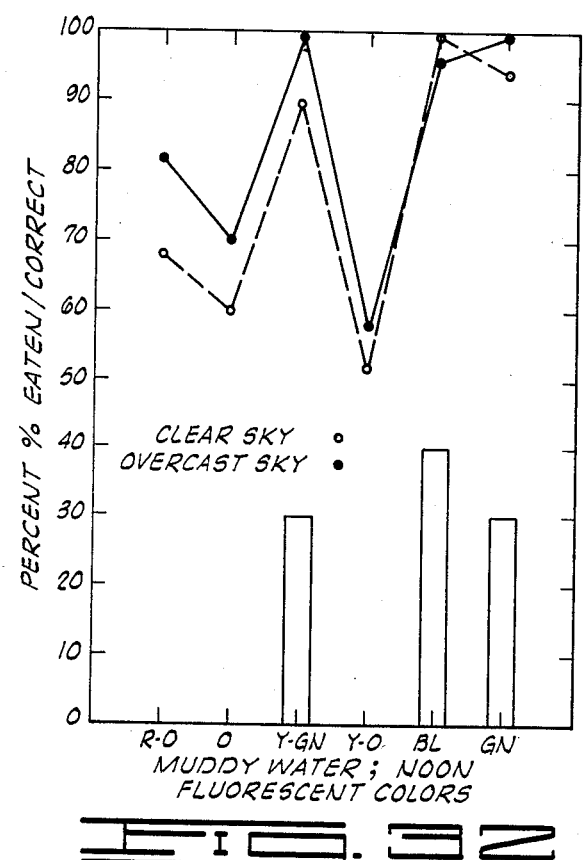

As shown in FIG. 20, the bass utilized in the colored plate experiments showed the best ability to discern, and move to, the green, the yellow-green and the yellow-orange fluorescent plates. They apparently did not see the fluorescent blue plate well. These results correlate well with the results observed when the live crayfish were dropped into the tank. In such experiments, the bass consumed the green crayfish forty percent (40%) of the time, and in the case of the orange, yellow-green and yellow-orange crayfish, consumed crayfish of each of these colors twenty percent (20%) of the time.

The remainder of FIGS. 21-34 continue to show good correlation between the actual perception of the untrained bass of live fluorescent colored food and the perception of the bass trained of fluorescent colored plates.

A submersible photometer (light meter) was initially utilized to record the light transmittance value in clear water at the surface of the water in which the bass were located during testing and under a maximum ambient light condition, i.e., high noon with a bright, clear sky. This value was taken to be one hundred percent (100%) transmittance for reference purposes. Then, during each test carried out in Experiment IV (the colored plate tests), the light transmittance value at the depth at which the tested bass was located was measured for each of the water clarity and ambient light conditions. Thus, a light transmittance value was recorded for each of the tests in clear water, and stained water and in muddy water, and for each daytime period for which the ambient light conditions were simulated (early morning, mid-morning, noon, mid-afternoon and evening as hereinbefore described). The light value was also recorded for ambient light conditions adjusted at these times of day for either a clear or overcast sky condition. Each of the light transmittance values as thus recorded was recorded as a percentage of the reference transmittance value determined where the ambient light at the surface of clear water was measured in bright sunlight with a clear sky condition. By relating the measured light transmittance values to a reference (as a percentage thereof) in this way, the results became repeatable even though some instrument error or differences might occur when absolute light transmittance values, in lumens or other suitable units, could also be used, however. These light transmittance values, as recorded for each of the colored plate sensitivity tests, were then duplicated to the exact percentile value of light transmittance by control of ambient light during the colored food preference experiments described in Experiment 5. In further tests, the live bait (crayfish) tests were carried out in clear, stained and muddy water, varying the light transmissivity values in increments of 10% from 0% to 100%.

APPARATUS AND INSTRUMENTATION

A color chart was formulated in the form of bands portraying the various colors which had been tested, both by the use of colored plates and live crayfish. The tested colors were charted in sequence on the bands from left to right in correlation to light meter readings observed when the bass preferred a particular color on the band. These light meter readings on the chart corresponded to the deflection of the light meter galvanometer needle, with the various readings or positions of the needle extending from zero percent (0%) to one hundred percent (100%) from left to right. Three such bands of the various colors corresponding to these light transmittance values were established for clear water, stained water and muddy water. Each of the bands shows the series of tested non-fluorescent colors in the lower blocks, and the tested fluorescent colors in the superimposed or upper block.

For clarity of presentation and enhancement of the reader's understanding, the way in which the three multicolored bands were sequenced and laid out, and arranged in correlation to the several light transmittance values over the range of from zero to one hundred percent, is shown in FIGS. 35A and 35B. FIG. 35A represents the left half of the three bands, and is continued toward the right in FIG. 35B which shows the right portion of the three bands extending from a light transmittance value of about 53 percent to 100 percent. From the foregoing explanation, it will be understood that the relatively high light transmittance values appearing toward the right side of FIG. 35B are those which were experienced only during the brightest daytime conditions, i.e., mid-morning through mid-afternoon with relatively clear skies. In the case of overcast skies, early morning or dusk conditions, the light transmittance values were, of course, lower, and the color selections of the bass in the three types of water conditions (clear water, stained water or muddy water) therefore appear more toward the left portion of FIG. 35A.

Thus, for example, with a light transmittance value ranging between 25 percent and 45 percent under a condition of clear water during early morning hours, and with a clear sky, the bass was most sensitive to yellow, blue and purple. Some attraction was also shown for the silver color. These light transmittance values appear beneath the bottom band (the clear water band) in FIG. 35A.

As another example of the manner in which the colors are arranged within the bands portrayed in FIGS. 35A and 35B, the light transmittance values ranging from 40 percent to 70 percent, (typically being those obtained in mid-morning, under overcast sky) mean that in clear water (the lower band), the colors purple, silver, green, orange and gray are the most visible to the bass. These colors correspond to the colors best seen or at least most attractive to the bass in both the colored plate tests and the live food tests as graphically depicted in FIG. 5. In this same range of light transmittance values, however, different colors are better seen in stained water (the central or intermediate band portrayed in FIGS. 35A and 35B). These colors were orange, red, silver and blue. Over the same light transmittance range of 40 percent to 70 percent, the top color band in FIG. 35A shows that the bass see silver, white, red, gold and green best in muddy water.

In sum, for each transmittancy value ranging from zero to one hundred percent, the colors most visible to the fish is presented in a series of three color bands representing clear water (the lower band), stained water (the middle band) and muddy water (the top band).

In field tests, I have determined that by lowering the probe of the light meter into the water to a depth where it is desired to fish, a percent light transmittancy value can be read by a readout instrument connected to the probe and located at the surface, and that this light transmittancy value, in conjunction with a water clarity reading as determined by a Secchi disc, can then be used with an appropriate color chart to identify for the fisherman, those lure colors which will be best seen by the fish as a result of the amount of light transmitted to the depth at which the fish is located, and the particular water clarity which obtains during the fishing. In a preferred embodiment of the invention, the top of the probe is made in the configuration and design of a Secchi desc.

In FIG. 36 of the drawings there is illustrated the face of a light transmittancy readout panel 10 which has been integrated with a color chart 12 of the type shown in FIGS. 35A and 35B. It should be pointed out, however, that in order to minimize congestion and crowding on the FIG. 36 arcuate chart, the basic color shades used on the actual instrument and shown in FIGS. 35A and 35B have not been illustrated. A needle 20 is provided which swings about a pivot point in response to the light transmittancy sensed by the probe so that a fisherman, by observing the points upon the several color bands where the needle crosses the bands, can determine precisely the color of lure which should be utilized in fishing. The readout instrument, having the integrated color chart thereon consisting of the three color bands used for clear, stained and muddy water, is preferably mounted in the fishing boat and is used in conjunction with the light sensitive probe which can be lowered into the water to the fishing depth. The Secchi disc is used to gauge or test the clarity of the water to determine whether it is clear, stained or muddy in accordance with the criteria previously described.

After the fisherman has determined the water clarity in terms of one of these three categories, the probe is lowered to the fishing depth and a readout response appears on the instrument before the fisherman, which, in a preferred embodiment, appears generally in the form shown in FIG. 36. At this time, the needle 20 will swing to the right to a degree determined by the light transmittance value being sensed by the light sensitive probe at the depth to which it has been lowered, i.e., at the depth where the fisherman intends to fish. As shown in FIG. 36, for example, the needle has swung to a location where it shows a 40 percent light transmittance value at the fishing depth, and thus crosses the clear water band in the purple color region, crosses the stained water band in the orange region, and crosses the muddy water band in the zone where the silver color area intersects the white color area, indicating that either a silver lure or white lure would be the most useful lure in muddy water with this light transmittance value appertaining at the selected fishing depth.

Since many fishermen believe that a combination of colors on the lure will be more successful in attracting fish than a single color, and my own experience indicates that there is much to recommend this practice, the instrument for color selection which is provided has the further utility of indicating to the fisherman, in addition to the color most visible under the prevailing conditions, the fringe or adjacent colors to that most preferred color, which adjacent colors also are seen well by the bass under those same conditions. The instrument thus provides an indication to the fisherman of the combination of colors which should be used in selecting a multicolored lure.

Although a preferred embodiment of the invention has been herein described, it will be understood that various changes and innovations can be made in the indicated preferred embodiment without departure from the basic principles of the invention. For example, different forms of instruments can be used to portray the colors in the experimentally determined sequence and correlation to light transmittance values, and although the instrument depicted in FIG. 36 illustrates a preferred form of color banding and charting as correlated with the water conditions and light transmittance values, other arrangements can be utilized in accordance with the principles of the invention and toward the achievement of the objectives of permitting the fisherman to scientifically select a lure color, or mixture of colors, which is most apt to catch fish as a result of its high visibility to the fish under the prevalent conditions. All such changes and innovations are therefore deemed to fall within the spirit and scope of the invention except as the same may be necessarily limited by the appended claims or reasonable equivalents thereof.

What is claimed is:

1. The method of catching fish which comprises:
observing the clarity of the water to be fished to determine whether the water is clear, stained or muddy;
measuring the light transmittance at the depth in the water where the fishing lure is to be placed; then
selecting the color of lure to be used by matching the observed water clarity and the measured light transmittance with a lure color which has previously been determined to be the most effective lure color to use under the measured light transmittance and observed water clarity condition, said most effective lure colors including certain non-florescent lure colors determined to be the most effective to use under various light transmittance and observed water clarity conditions as follows:

| Water Condition | Light Transmittance Value, Percent* | | | | | |
|---|---|---|---|---|---|---|
| | 0 | 10 | 20 | 30 | 40 | 50 |
| Clear | Black | White | Yellow Blue | Blue | Purple | Silver Green |
| Stained | Black | White Black | Black Yellow | Gold | Orange | Red |
| Muddy | Black | Orange | Yellow | Yellow Silver | Silver White | Red White |
| | 60 | 70 | 80 | 90 | 100 | |
| Clear | Green | Gray | Gold | Red | Red | |
| Stained | Silver | Blue | Purple Green | Green | Gray | |
| Muddy | Red Gold | Green | Gray Blue | Purple | Black | |

*Percent transmittance is equal to light intensity at fishing depth as a percentage of light intensity at surface on a clear summer day at noon.

2. The method of catching fish which comprises:
observing the clarity of the water to be fished to determine whether the water is clear, stained or muddy;
measuring the light transmittance at the depth in the water where the fishing lure is to be placed; then
selecting the color of lure to be used by matching the observed water clarity and the measured light transmittance with a lure color which has previously been determined to be the most effective lure color to use under the light transmittance and observed water clarity condition, the matching of the observed water clarity and measured light transmittance with a lure color being accomplished by:
swinging pointer means through an arc in response to the measured light transmittance, so that the magnitude of the swing of the pointer means is directly proportional to the magnitude of the light transmittance measured; and
arranging colors on a chart placed adjacent and parallel to the plane in which the pointer means swings, each of said colors being placed at one or more specific locations on the chart which is determined by
 (a) the place on the chart to which the pointer means will point when the pointer means responds to a specific magnitude of measured light transmittance; and
 (b) at least one predetermined water clarity condition at which a bass fish will see the respective specific color better than other colors when located in water of said one predetermined water clarity condition with the light transmittance value at the location of the bass fish being substantially equivalent to said specific magnitude of measured light transmittance.

3. The method of catching fish which comprises:
observing the clarity of the water to be fished to determine whether the water is clear, stained or muddy, such observation being carried out by lowering a Secchi disc into the water and observing the depth at which it can no longer be seen, with clear water being identified as that in which the disc remains visible from above the water as the disc is lowered to a depth of at least four feet, and muddy water as that in which the disc disappears from view during lowering to the first two feet;
measuring the light transmittance at the depth in the water where the fishing lure is to be placed; then selecting the color of lure to be used by matching the observed water clarity and the measured light transmittance with a lure color which has previously been determined to be the most effective lure color to use under the measured light transmittance and observed water clarity condition.

4. The method of catching fish as defined in claim 3 wherein stained water is that in which the Secchi disc remains visible during lowering through the first two feet of water, but disappears from view before the disc has reached a depth of four feet.

5. Apparatus for indicating which colors predatory fresh water game fish are most attracted to under varying light intensity and varying water clarity conditions when such are prevalent at a given location in a body of water comprising:
a substantially monoplanar visual display surface; and
a series of bodies of discrete colors arranged on said surface in an order which conforms to a predetermined identification of location for each color which means it is the color which will be most attractive to the fish when the water in which the fish is located is of a certain clarity and the light transmittance at that fish location is at a certain value, all according to the following correlation for non-fluorescent colors:

| Water Condition | Light Transmittance Value, Percent* | | | | | |
|---|---|---|---|---|---|---|
| | 0 | 10 | 20 | 30 | 40 | 50 |
| Clear | Black | White | Yellow Blue | Blue | Purple | Silver Green |
| Stained | Black | White Black | Black Yellow | Gold | Orange | Red |
| Muddy | Black | Orange | Yellow | Yellow Silver | Silver White | Red White |
| | 60 | 70 | 80 | 90 | 100 | |
| Clear | Green | Gray | Gold | Red | Red | |
| Stained | Silver | Blue | Purple Green | Green | Gray | |
| Muddy | Red Gold | Green | Gray Blue | Purple | Black | |

*Percent transmittance is equal to light intensity at fishing depth as a percentage of light intensity at surface on a clear summer day at noon.

6. Apparatus for indicating which colors fish are most attracted to under varying light intensity and varying water clarity conditions as defined in claim 6 and further characterized as including means connected to said indicating means for assessing and signalling the water clarity and the light transmittance value at various selected depths in a body of water, said assessing and signally means including a movable indicating means for identifying a particular body of color or bodies of colors on said surface which will be more attractive to a bass fish located at such selected depth than other color bodies on said surface.

7. Apparatus for indicating an effective choice of fishing lure color to a fisherman comprising:
means for measuring the clarity of the water in which fishing is to be carried out;
a light sensing probe for sensing the light transmittance at the depth in the water at which fishing is to be carried out;
a readout meter having charted thereon colors which have been previously determined to be well seen by bass under various conditions of light transmittance and water clarity, each color being located at a particular and discrete place on the face of the meter determined by specific values of light transmittance and water clarity at which that specific color is best seen by a bass fish relative to other colors not as well seen under those specific conditions of water clarity and light transmittance, said meter further including a movable needle responsive to a signal received from said light sensing probe to move so as to point to a particular color on said chart which, according to its location on the chart, will be the most effective lure color to use in water of a particular clarity condition as measured by said clarity measuring means; and
flexible signal conducting means interconnecting said probe with said meter.

8. Apparatus for indicating an effective choice of fishing lure color to a fisherman as defined in claim 7 wherein said water clarity measuring means comprises:
a Secchi disc; and
means for lowering the Secchi disc in the water.

9. Apparatus for indicating an effective choice of fishing lure color as defined in claim 8 wherein said colors charted on said readout meter are arranged on the face of the meter in three bands, a first one of said bands including colors best seen by fish under a muddy water condition, with the colors arranged serially in said first band from one end of the band to the other end of the band in the order of the colors as best seen under increasing light transmittance values, from low transmittance to high transmittance, a second one of said bands including colors best seen by fish under a stained water condition, with the colors arranged serially in said second band from one end of the band to the other end of the band in the order of the colors as best seen under increasing light transmittance values, from low transmittance to high transmittance, and a third one of said bands including colors best seen by fish under a clear water condition, with the colors arranged serially in said third band from one end of the band to the other end of the band in the order of the colors as best seen under increasing light transmittance values, from low transmittance to high transmittance.

10. Apparatus for indicating an effective choice of fishing lure color as defined in claim 7 and further characterized as including real means adapted for mounting on a boat and having said flexible signal conducting means releasably reeled thereon.

11. Apparatus for indicating an effective choice of fishing lure color as defined in claim 9 wherein said colors in said muddy water, stained water and clear water bands are arranged according to light transmittance values as follows:

| Water Condition | Light Transmittance Value, Percent* | | | | | |
|---|---|---|---|---|---|---|
| | 0 | 10 | 20 | 30 | 40 | 50 |
| Clear | Black | White | Yellow Blue | Blue | Purple | Silver Green |
| Stained | Black | White Black | Black Yellow | Gold | Orange | Red |
| Muddy | Black | Orange | Yellow | Yellow Silver | Silver White | Red White |
| | 60 | 70 | 80 | 90 | 100 | |
| Clear | Green | Gray | Gold | Red | Red | |
| Stained | Silver | Blue | Purple Green | Green | Gray | |
| Muddy | Red Gold | Green | Gray Blue | Purple | Black | |

*Percent transmittance is equal to light intensity at fishing depth as a percentage of light intensity at surface on a clear summer day at noon.

12. Apparatus for indicating an effective choice of fishing lure color as defined in claim 9 wherein the colors in said bands of color are correlated to light transmittance values in the manner shown in FIGS. 35A and 35B of the drawings of this application.

13. Apparatus for indicating an effective choice of fishing lure color as defined in claim 12 wherein said Secchi disc is attached to and formed integrally with said light sensing probe.

14. Apparatus for indicating an effective choice of fishing lure color as defined in claim 13 wherein said flexible signal conducting means is the means for lowering the Secchi disc in the water.

15. Apparatus for indicating an effective choice of fishing lure color as defined in claim 9 wherein said bands are each arcuate and the bands are contiguous; and wherein said readout meter is constructed so that said needle swings in an arc in response to a signal received from said light sensing probe.

16. Apparatus for selecting a fishing lure of a color which is relatively more effective than other colors in attracting and catching fish comprising:

a Secchi disc assembly including a visible Secchi disc and means for lowering the visible Secchi disc into the water;

a light sensing probe responsive to light of varying intensity to develop a signal of varying intensity;

means for lowering said probe to a depth in the water at which fishing is to be carried out;

means for converting the signal of the probe to a readable light transmittance value correlatable to a standard light transmittance value; and a portable chart indicative of which specific colors can be best seen, relative to other colors, under specific conditions of light transmittance, as valued in the readable units of said signal converting means, and water clarity as determined by observation of said Secchi disc during lowering of the disc into the water.

17. Apparatus for selecting a fishing lure as defined in claim 16 wherein said Secchi disc and probe are integrally formed as a single physical unit.

18. Apparatus for selecting a fishing lure as defined in claim 16 wherein said converting means is a meter including a swinging needle having an amplitude of swing corresponding to the magnitude of the probe signal; and said chart is a series of colors placed at discrete, preselected locations on the face of said meter adjacent said needle.

* * * * *